(12) United States Patent
Richter et al.

(10) Patent No.: US 12,539,565 B2
(45) Date of Patent: Feb. 3, 2026

(54) METHOD FOR PRODUCING SHORT SUBCRITICAL CRACKS IN SOLID BODIES

(71) Applicant: Siltectra GmbH, Dresden (DE)

(72) Inventors: Jan Richter, Dresden (DE); Ralf Rieske, Dresden (DE); Marko Swoboda, Dresden (DE); Albrecht Ullrich, Dresden (DE)

(73) Assignee: Siltectra GmbH, Dresden (DE)

( * ) Notice: Subject to any disclaimer, the term of this patent is extended or adjusted under 35 U.S.C. 154(b) by 537 days.

(21) Appl. No.: 16/971,543

(22) PCT Filed: Feb. 19, 2019

(86) PCT No.: PCT/EP2019/054081
§ 371 (c)(1),
(2) Date: Aug. 20, 2020

(87) PCT Pub. No.: WO2019/162266
PCT Pub. Date: Aug. 29, 2019

(65) Prior Publication Data
US 2020/0398381 A1 Dec. 24, 2020

(30) Foreign Application Priority Data
Feb. 20, 2018 (DE) .......................... 102018001327.9

(51) Int. Cl.
*B23K 26/53* (2014.01)
*B23K 26/00* (2014.01)
(Continued)

(52) U.S. Cl.
CPC ............ *B23K 26/53* (2015.10); *B23K 26/032* (2013.01); *B23K 26/0006* (2013.01);
(Continued)

(58) Field of Classification Search
None
See application file for complete search history.

(56) References Cited

U.S. PATENT DOCUMENTS

2005/0205538 A1    9/2005 Li
2014/0038392 A1*   2/2014 Yonehara ............ H01L 31/0682
                                                438/463
(Continued)

FOREIGN PATENT DOCUMENTS

CN        1896343 A    1/2007
CN      105436710 A    3/2016
(Continued)

OTHER PUBLICATIONS

Klerks, Tobias, et al., "Flexible beam shaping system for the next generation of process development in laser micromachining", Lane 2016, 9th International Conference on Photonic Technologies, pp. 1-8.
(Continued)

*Primary Examiner* — Elizabeth M Kerr
(74) *Attorney, Agent, or Firm* — Murphy, Bilak & Homiller, PLLC

(57) ABSTRACT

The invention relates to a method for producing modifications (9) in the interior of a solid body (1). The method comprises the introduction of laser radiation (14) of a laser (29) into the interior of the solid body (1) via a first surface (8) of the solid body (1). The solid body (1) forms a crystal structure. Modifications (9) are produced at predefined points in a production plane (4) in the interior of the solid body (1) by the laser radiation (14). The modifications (9) are closer to the first surface (8) than to a second surface, the second surface being parallel to the first surface (8). A plurality of linear forms (103) can be produced by the modifications (9). The solid body (1) cracks subcritically in the region of each modification (9). The subcritical cracks
(Continued)

have an average crack length of less than 150 µm orthogonally to the direction of longitudinal extent of the linear form in question. Modifications (9) that belong to the same linear form (103) and that are produced one after the other are produced at a distance from each other that is defined by the function $(d-x)/d < -0.31$, where $x > d$.

11 Claims, 14 Drawing Sheets

(51) Int. Cl.
*B23K 26/03* (2006.01)
*B23K 26/0622* (2014.01)
*B23K 101/40* (2006.01)
*B23K 103/00* (2006.01)

(52) U.S. Cl.
CPC ...... *B23K 26/0624* (2015.10); *B23K 2101/40* (2018.08); *B23K 2103/56* (2018.08)

(56) References Cited

U.S. PATENT DOCUMENTS

| | | | |
|---|---|---|---|
| 2016/0052090 A1* | 2/2016 | Tanigawa | H01L 21/78 219/121.68 |
| 2016/0288250 A1 | 10/2016 | Hirata et al. | |
| 2016/0354862 A1* | 12/2016 | Hirata | B28D 5/0011 |
| 2017/0151627 A1* | 6/2017 | Hirata | B23K 26/0006 |
| 2017/0291255 A1 | 10/2017 | Hirata | |
| 2017/0301549 A1 | 10/2017 | Suzuki | |
| 2018/0108568 A1* | 4/2018 | Wang | B23K 26/0006 |
| 2020/0398381 A1 | 12/2020 | Richter et al. | |

FOREIGN PATENT DOCUMENTS

| | | | | |
|---|---|---|---|---|
| CN | 106216857 A | 12/2016 | | |
| CN | 107107260 A | 8/2017 | | |
| CN | 107283078 A | 10/2017 | | |
| DE | 102016201780 A1 | 8/2016 | | |
| DE | 102016208958 A1 | 12/2016 | | |
| DE | 102017206178 | 10/2017 | | |
| EP | 2599582 | 7/2011 | | |
| JP | 2018078335 A | 5/2018 | | |
| KR | 20140140053 A | 12/2014 | | |
| KR | 20170086644 A | 7/2017 | | |
| WO | 2016083610 B | 6/2016 | | |
| WO | WO-2016083610 A2 * | 6/2016 | ............ | B23K 26/40 |
| WO | 2017167614 A1 | 10/2017 | | |

OTHER PUBLICATIONS

Leonard, R.T., et al., "Exploration of Bulk and Epitaxy Defects in 4H-SiC Using Large Scale Optical Characterization", Material Science Forum, ISSN: 1662-9752, vol. 897, 2017, pp. 226-229.

Manning, Ian, et al., "Large Area 4H SiC Products for Power Electronic Devices", Materials Science Forum, ISSN: 1662-9752, vol. 858, Revised: Nov. 20, 2015, pp. 11-14.

Watanabe, Ryosuke, et al., "Optical Properties of Spin-Coated TiO2 Antireflection Films on Textured Single-Crystalline Silicon Substrates", Hindawi Publishing Corporation, International Journal of Photoenergy, 2015, accessed online at https://www.hindawi.com/journals/ijp/2015/147836/ on Apr. 26, 2019, pp. 1-7.

* cited by examiner

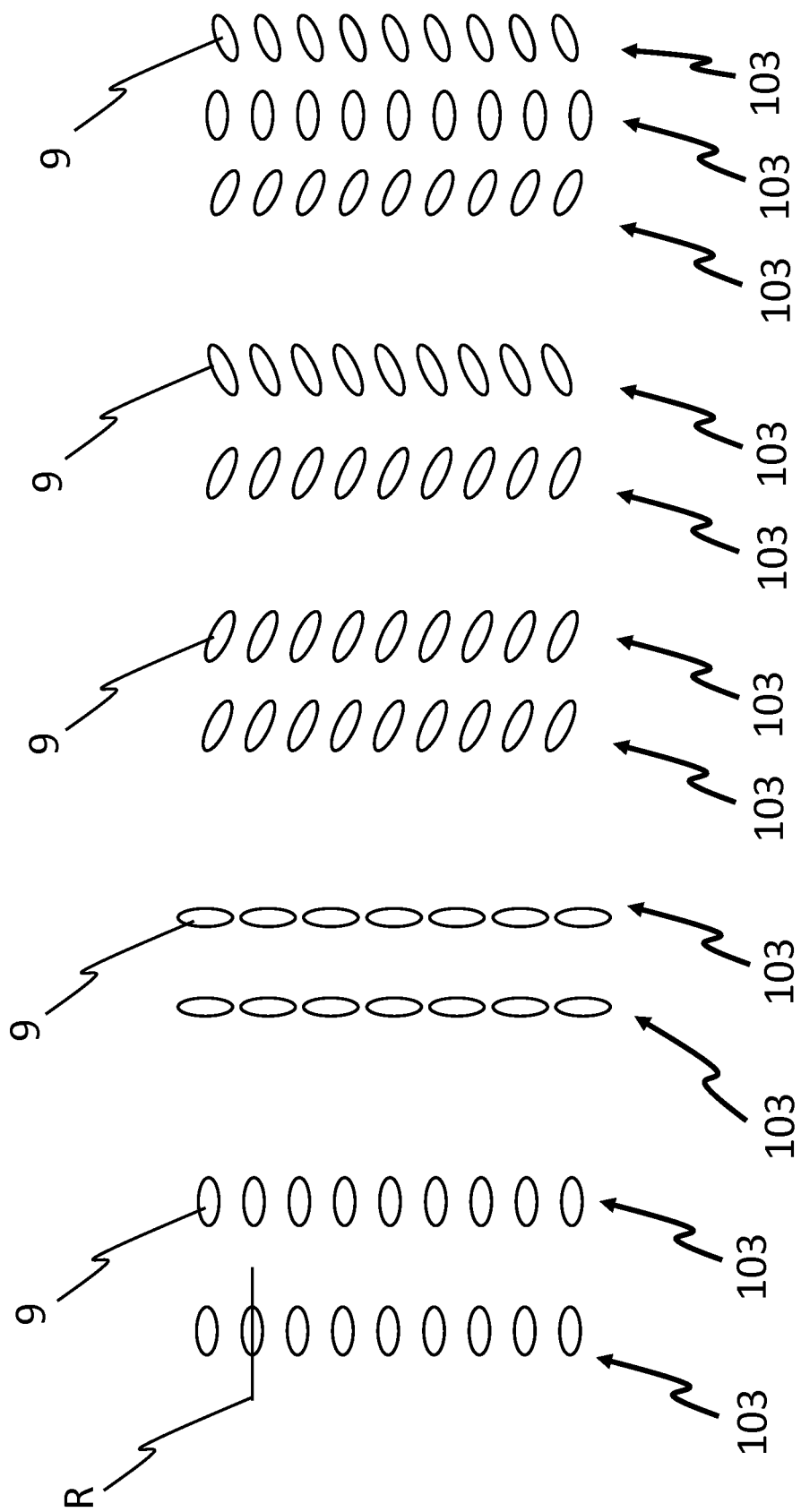

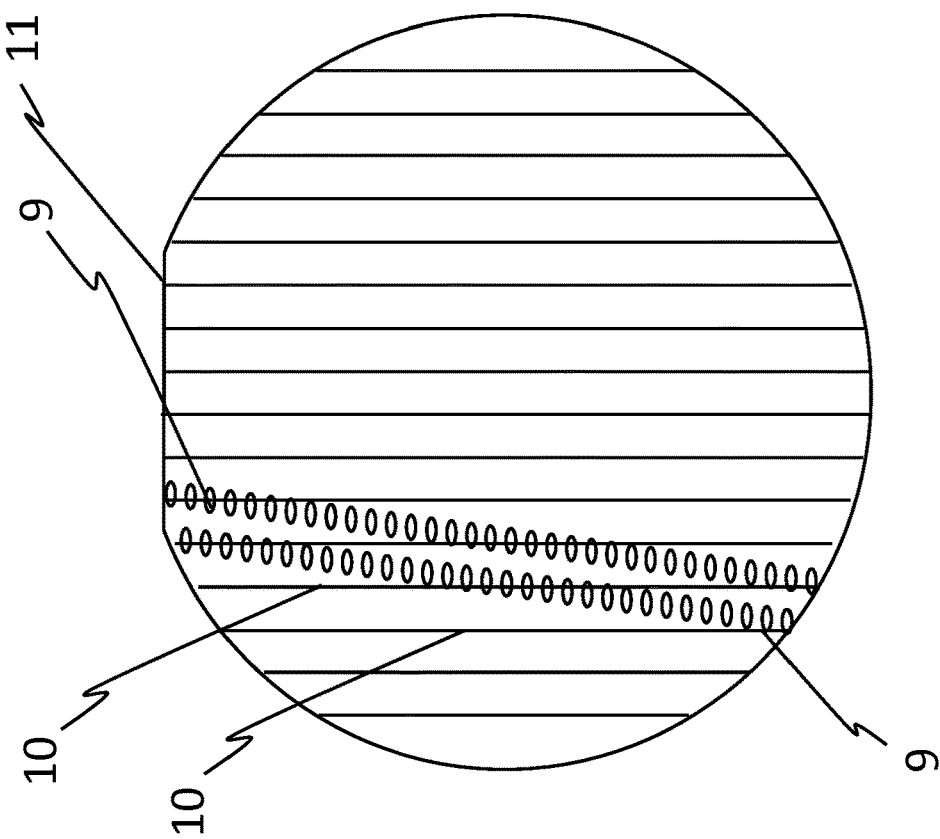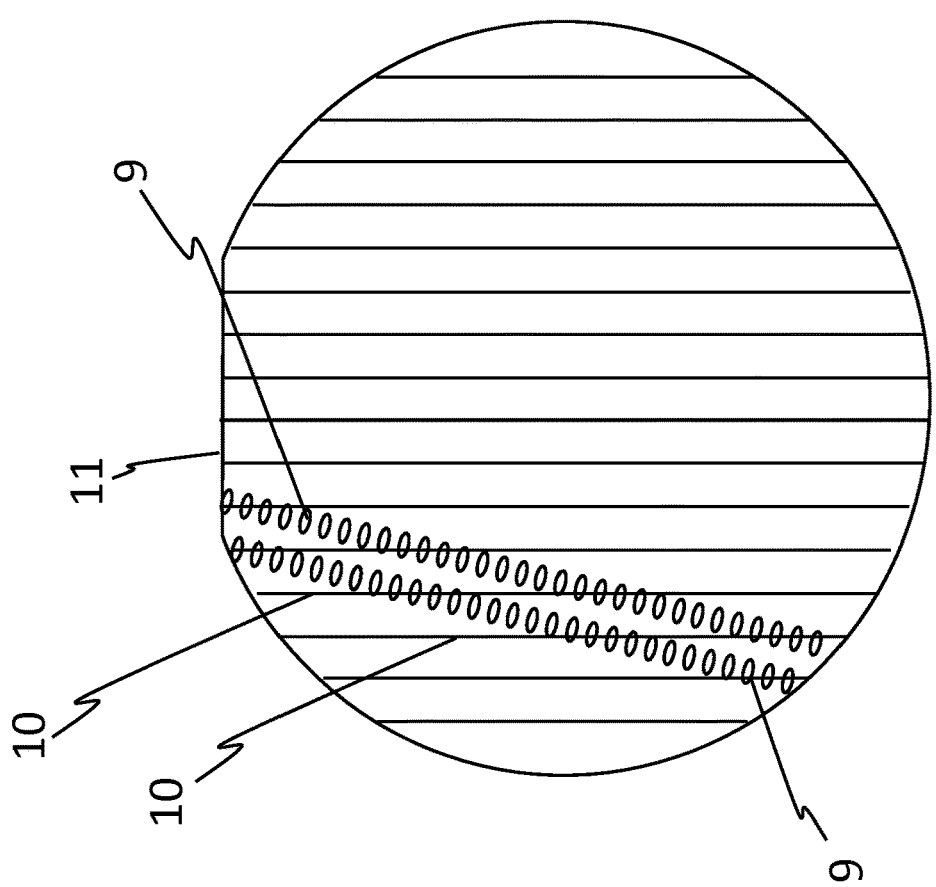
Fig. 3b
Fig. 3a

Si 111

Si 110

Si 100

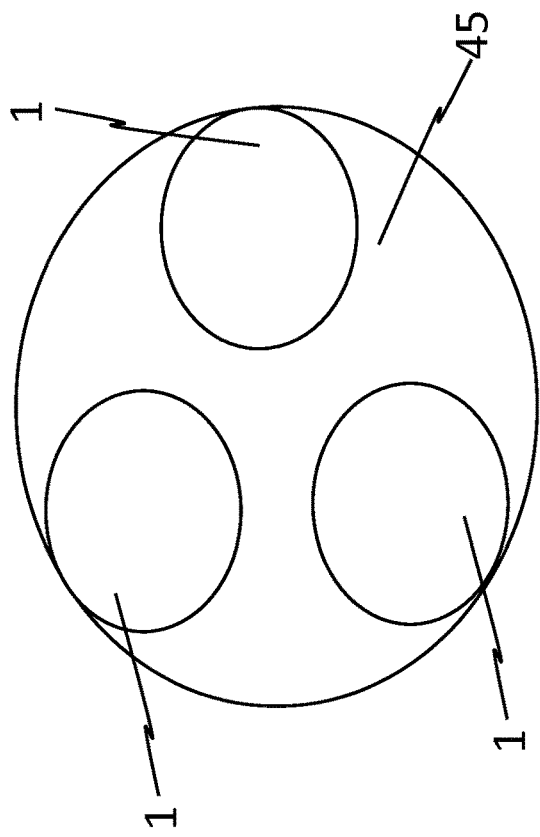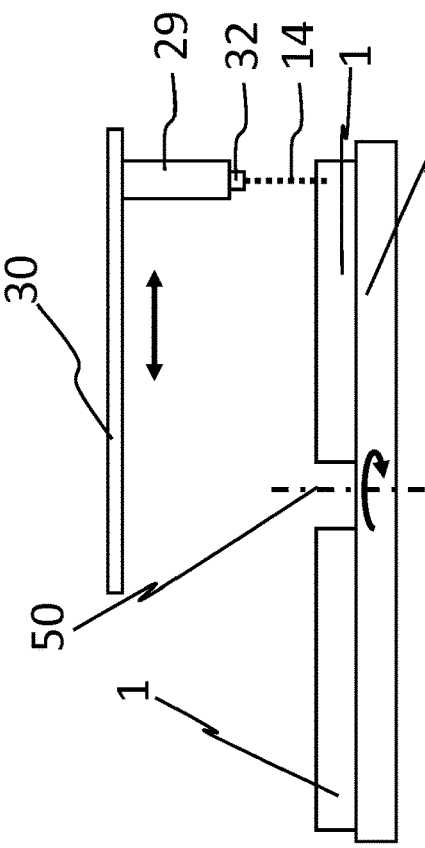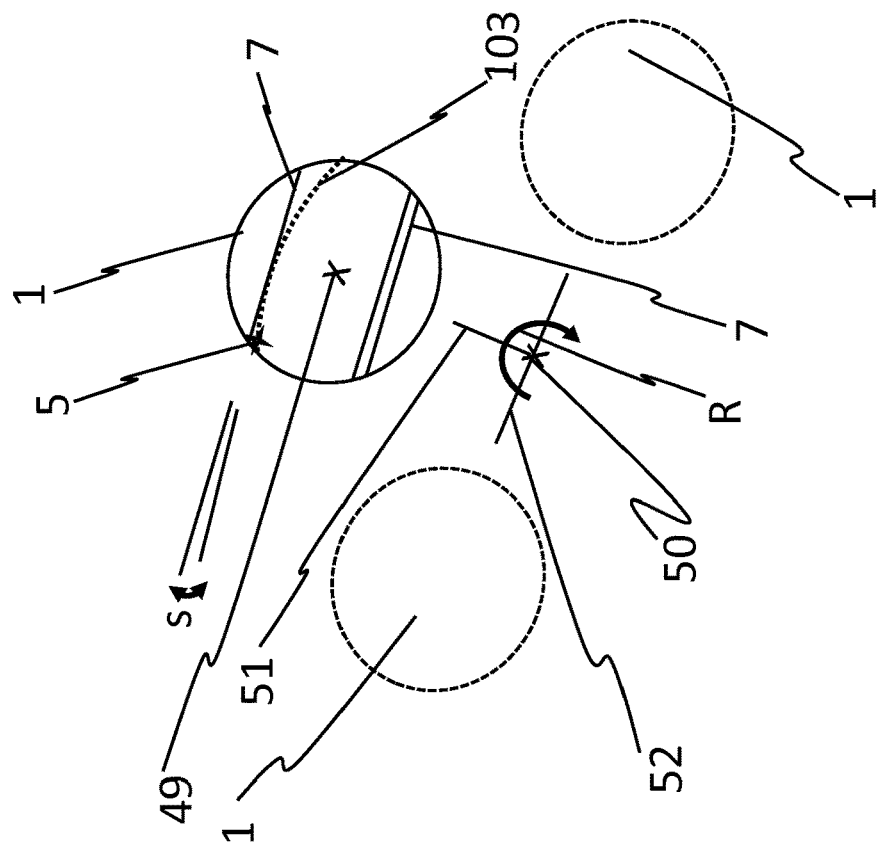

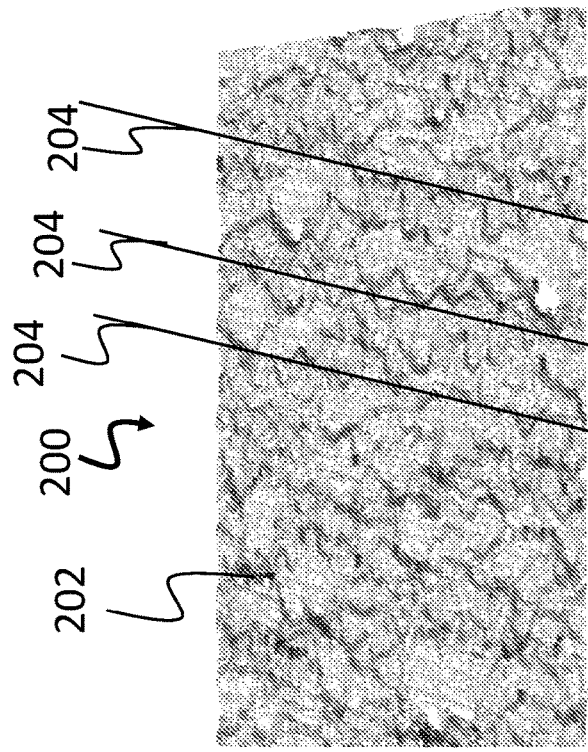
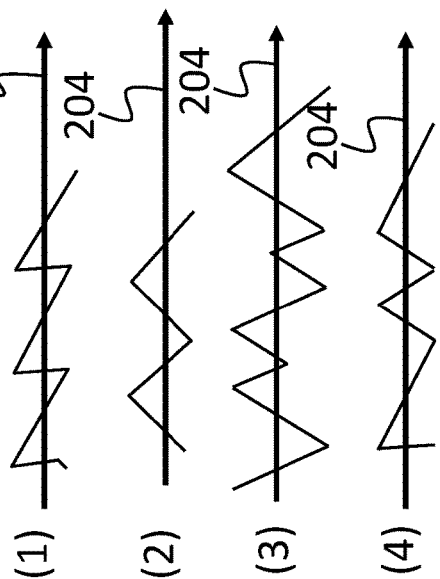
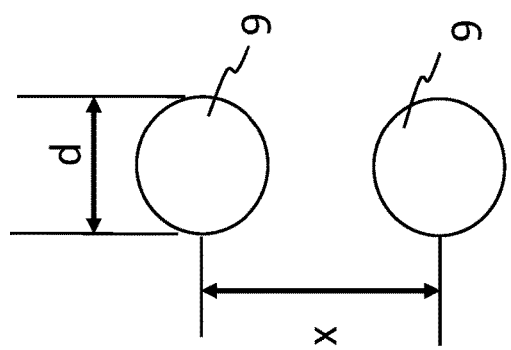
Fig. 11b
Fig. 11d
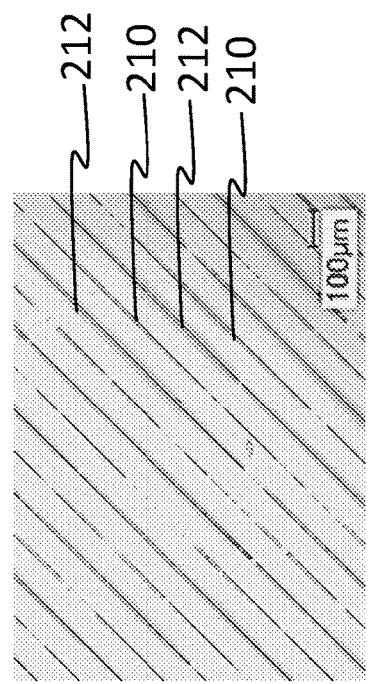
Fig. 11a
Fig. 11c

METHOD FOR PRODUCING SHORT SUBCRITICAL CRACKS IN SOLID BODIES

The present subject matter relates to methods for producing modifications in the interior of a solid body, to a method for separating at least one solid body layer from a solid body and to a solid body with an advantageous topography.

The document DE102017206178A1 discloses a wafer production method involving producing a wafer from a cylindrical SiC single-crystal ingot, which has a cylindrical circumferential surface with a first alignment plane and a second alignment plane, which is shorter than the first alignment plane and perpendicular to the first alignment plane, and a circular upper face, wherein the cylindrical SiC single-crystal ingot has a c-axis, which is inclined from a vertical axis perpendicular to the circular upper face in the direction of the second alignment plane, and has an angle of deviation which is formed between a c-plane perpendicular to the c-axis and the upper face, wherein the wafer production method comprises: a detecting step for a processing feed direction with confirmation whether or not a direction in which the c-axis is inclined and the second alignment plane are perpendicular to one another and detecting a processing feed direction perpendicular to the direction in which the c-axis is inclined;

a forming step for a region of reduced strength with a positioning of the focal point of a laser beam from the circular upper face at a depth in the cylindrical SiC single-crystal ingot, wherein the depth corresponds to the thickness of a wafer to be produced, and, during a relative movement of the cylindrical SiC single-crystal ingot and the focal point in the processing feed direction that has been detected in the detecting step for a processing feed direction, irradiating the cylindrical SiC single-crystal ingot with a laser beam which has a wavelength that transfers SiC in order thereby to form a straight region of reduced strength which is built up from a modified layer parallel to the circular upper face and cracks which extend from the modified layer at a depth along the c-plane which corresponds to the thickness of the wafer to be produced; a peel-off plane forming step involving forming a peel-off plane in the cylindrical SiC single-crystal ingot by repeatedly performing the forming step for a region of reduced strength at predetermined intervals in a direction perpendicular to the processing feed direction; and, after the peel-off plane forming step, a wafer production step involving producing a wafer from the cylindrical SiC single-crystal ingot by peeling off a portion of the cylindrical SiC single-crystal ingot from the peel-off plane, which serves as a boundary surface; wherein the detecting step for a processing feed direction includes: a sampling step involving performing sampling irradiation for positioning the focal point of a laser beam from the circular upper face at a predetermined depth in the cylindrical SiC single-crystal ingot and, during a movement of the cylindrical SiC single-crystal ingot and the focal point in relation to one another, irradiating the cylindrical SiC single-crystal ingot with a laser beam which has a wavelength that transfers SiC along a direction parallel to the second alignment plane and a multiplicity of directions which are inclined clockwise and counterclockwise by respective predetermined angles from the second alignment plane, in order thereby to form a multiplicity of sampled straight regions of reduced strength in the cylindrical SiC single-crystal ingot, wherein each of the sampled straight regions of reduced strength is built up from a modified layer parallel to the circular upper face and cracks which extend from the modified layer along the c-plane, and a determining step involving capturing respective images of the sampled straight regions of reduced strength by an imaging means, measuring the number of nodes that there are per unit length at each of the sampled straight regions of reduced strength in one of their images, and determining a direction in which the sampled straight region of reduced strength where the measured number of nodes is zero extends as a processing feed direction.

The document DE102016208958A1 discloses a wafer production method for producing a hexagonal single-crystal wafer from a hexagonal single-crystal ingot. The wafer production method includes a separation starting point forming step involving setting the focal point of a laser beam which has a transmission wavelength for the ingot to a predetermined depth from the upper face of the ingot in the interior of the ingot, wherein the depth corresponds to the thickness of the wafer to be produced, and, as the next step, applying the laser beam to the upper face of the ingot during relative movement of the focal point and the ingot, in order thereby to form a modified layer parallel to the upper face of the ingot and cracks which extend from the modified layer in order thereby to form a separation starting point. In order to form the modified layer, the laser beam is applied in a state in which the relationship $-0.3 \leq (d-x)/d \leq 0.5$ is maintained, where d is the diameter of a focal point of the laser beam and x is the distance between adjacent focal points of the laser beam. In this case: $d=1.22*lambda/Na$, where lambda represents the wavelength of the laser and Na represents the numerical aperture of the imaging.

The aforementioned methods are disadvantageous because focuses are chosen so close together that the following focus lies in a phase-transformed fraction. This has the effect however that the absorption increases very greatly. If material parameter fluctuations, such as for example defects, inclusions or dopings, then occur, the absorption can be further increased significantly, whereby the process of material transformation becomes uncontrollable or fractions of an uncontrolled size in the interior of the solid body are transformed. There is consequently a positive feedback. As a result of this positive feedback, greater amounts of material are then transformed, as a result of which greater compressive stresses are created in the interior of the solid body. These greater compressive stresses have the effect that the crack propagation takes place to a greater extent. Since, in the case of silicon carbide, the crack propagation generally takes place in the direction of the crystal lattice plane and the crystal lattice in the case of silicon carbide ingots or boules is generally inclined at an angle of 4°, extensive cracks cause damage to the surrounding structure of the solid body. These damaged fractions must then be removed by means of a grinding process. Therefore, the reduction of damage has the direct consequence of increasing output and reducing the reworking effort.

OBJECT

The object is therefore that of providing a solution which leads to less damage to the material of the solid body.

DESCRIPTION

The aforementioned object is achieved for example by a method for producing modifications in the interior of a solid body as claimed in claim 1. This method preferably comprises here at least the step that laser radiation of a laser is introduced into the interior of the solid body via a first surface of the solid body, the solid body forming a crystal structure and modifications being produced at predetermined locations on a production plane in the interior of the solid body by the laser radiation. The modifications are in this case preferably closer to the first surface than to a second surface, the second surface preferably being formed parallel to the first surface. Here, the laser radiation for producing the modifications preferably penetrates into the solid body via the first surface or the second surface.

It is however alternatively also possible that the modifications are closer to the second surface than to the first surface. Here, the laser radiation for producing the modifications preferably penetrates into the solid body via the first surface or the second surface.

Consequently, the laser beams may preferably penetrate into the solid body via the first surface and the modifications are then produced further from the first surface than from the second surface. The production plane then lies closer to the second surface than to the first surface.

Preferably, a number of linear shapes, in particular writing lines, are produced by the modifications. The linear shapes preferably extend for the most part in a curved or straight line. The solid body cracks, preferably subcritically, in the region of the respective modification. The subcritical cracks preferably have orthogonality to the direction of longitudinal extent of the respective linear shape an average crack length of less than 150 µm, in particular of less than 120 µm or less than 110 µm or less than 90 µm or less than 75 µm or less than 60 µm. Preferably, the subcritical cracks are shorter than twice the line spacing (=hatch).

The modifications that belong to the same linear shape and are successively produced are preferably produced at a distance from one another which is defined by the function $(d-x)/d < -0.31$, in particular $< -0.4$, where preferably $x > d$ applies.

At the height of the production plane or preferably parallel thereto, the subcritical cracks can propagate and thereby form a detachment plane. The detachment plane may therefore be closer to the first surface than the production plane or the detachment plane may be further away from the first surface than the production plane.

"In the region" of the modification may be understood here as meaning that the solid body undergoes cracking in the modified or in particular transformed-material fraction and in the solid-body fraction adjacent thereto.

It is, however, likewise possible that the modified region does not undergo cracking, but instead that the crack cracks in the longitudinal direction of the solid body, above or below the modification/s. If the solid body undergoes cracking above or below the modification/s, then the distance between the crack (in particular the subcritical crack) and the production plane is preferably less than 20 µm, in particular less than 15 µm or less than 10 µm or less than 5 µm or less than 4 µm or less than 3 µm or less than 2 µm or less than 1 µm.

This solution is advantageous because the stated condition $(d-x)/d < -0.31$ defines that the focal points of the successively produced modifications of the same linear shape are at a distance from one another such that the transformation of material produced beforehand causes little or no effects, in particular little or no increase in absorption, in the following transformation of material. This is advantageous because the modifications can consequently be produced with great precision, whereby the tendency of subcritical cracks to propagate more strongly can be better controlled.

Further preferred embodiments are the subject of the subclaims and the following parts of the description.

According to a further preferred embodiment, the laser radiation is of a defined polarization. The direction of polarization of the laser radiation is in this case preferably oriented at a defined angle, in particular a fixed angle of 0° or 90°, or in a defined angle range, in particular −20° to 20° or −10° to 10° or −5° to 5° or −1° to 1° or 70° to 110° or 80° to 100° or 85° to 95° or 89° to 91°, with respect to the crystal axis of the solid body. Alternatively, the direction of longitudinal extent of the modifications produced in the interior of the solid body by means of the laser beams may be oriented at a defined angle, in particular a fixed angle of 0° or 90°, or in a defined angle range, in particular −20° to 20° or −10° to 10° or −5° to 5° or −1° to 1° or 70° to 110° or 80° to 100° or 85° to 95° or 89° to 91°, with respect to an intersecting line, in particular a virtual intersecting plane, obtained at the intersection between the production plane and the crystal lattice plane.

In the case of polarization of the laser parallel to the major flat, it has been found when laser machining into the C side of the SiC substrate that a laser energy greater by around 50% is required in order to form comparable damage patterns in comparison with a laser polarization perpendicular to the major flat in this configuration. If circularly polarized light is used, then a transmitted laser power reduced by ⅓ as compared with transmission polarization is measured in a polarizer. This means that, for circularly polarized light, the laser energy used must probably be increased by an amount of up to 50% in comparison with the linear ideal polarization. This difference may however also be smaller, in particular as a result of the nonlinearity of the process and the effective cross sections for multiphoton effects in SiC for circularly polarized light. A value between the threshold energies for ideal laser polarization and laser polarization rotated by 90° thereto is accordingly also possible, since both polarizations are transiently passed over in the course of the rotating laser polarization. Multiphoton effects, however, usually have better effective cross sections for linearly polarized light, and so even greater energies have to be expended for perfectly circularly polarized light.

The aforementioned object can likewise be achieved by a method for producing modifications in the interior of a solid body as claimed in claim 3. This method preferably comprises at least the step that laser radiation of a laser is introduced into the interior of the solid body via a first surface of the solid body, the solid body forming a crystal structure and modifications being produced at predetermined locations on a production plane in the interior of the solid body by the laser radiation. The modifications are in this case preferably closer to the first surface than to a second surface, the second surface preferably being formed parallel to the first surface. Here, the laser radiation for producing the modifications preferably penetrates into the solid body via the first surface or the second surface.

It is however alternatively also possible that the modifications are closer to the second surface than to the first surface. Here, the laser radiation for producing the modifications preferably penetrates into the solid body via the first surface or the second surface.

Consequently, the laser beams may preferably penetrate into the solid body via the first surface and the modifications are then produced further from the first surface than from the second surface. The production plane then lies closer to the second surface than to the first surface.

Preferably, a number of linear shapes, in particular writing lines, are produced by the modifications. The linear shapes preferably extend for the most part in a curved or straight line. The solid body cracks, preferably subcritically, in the region of the respective modification. The subcritical cracks preferably have orthogonality to the direction of longitudinal extent of the respective linear shape an average crack length of less than 150 µm, in particular of less than 120 µm or less than 110 µm or less than 90 µm or less than 75 µm or less than 60 µm. Preferably, the subcritical cracks are shorter than twice the hatch.

The laser radiation is preferably of a defined polarization or is polarized in a defined manner. The direction of polarization of the laser radiation is preferably oriented at a defined angle, in particular a fixed angle of 0° or 90°, or in a defined angle range, in particular −20° to 20° or −10° to 10° or −5° to 5° or −1° to 1° or 70° to 110° or 80° to 100° or 85° to 95° or 89° to 91°, with respect to the crystal axis of the solid body. Alternatively, the direction of longitudinal extent of the modifications produced in the interior of the solid body by means of the laser beams may be aligned at a defined angle, in particular a fixed angle of 0° or 90°, or in a defined angle range, in particular −20° to 20° or −10° to 10° or −5° to 5° or −1° to 1° or 70° to 110° or 80° to 100° or 85° to 95° or 89° to 91°, with respect to an intersecting line obtained at the intersection between the production plane and the crystal lattice plane.

The average crack length is preferably determined here in one plane, i.e. the crack propagation in the direction orthogonal to the direction of longitudinal extent of the linear shape on the one hand and on the other hand the linear shape is detected and preferably evaluated or determined in a modification-resolved manner.

Here, the solid body may comprise silicon carbide or consist of silicon carbide, in particular doped silicon carbide.

According to a further preferred embodiment, modifications that belong to the same linear shape and are successively produced are produced at a distance from one another which is defined by the function $(d−x)/d<0$, in particular $<−0.3$ or $<−0.31$ or $<−0.4$ or $<−0.45$ or $<−0.5$ or $<−0.55$ or $<−0.6$ or $<−0.65$ or $<−0.7$ or $<−0.75$, where preferably $x>d$ applies. The statement $<−0.31$ means here less than $−0.31$; these are larger numbers in terms of the amount, such as for example $−0.5$. By contrast, $−0.1$ is smaller in terms of the amount than the amount of $−0.31$, and consequently $−0.1$ would not be included.

According to a further preferred embodiment, the successively produced modifications of a linear shape are separated from one another by unmodified material of the solid body. In other words, the phase change brought about by the laser modification preferably does not take place between individual modifications. The individual modifications of a linear shape are therefore preferably spatially separated from one another to an extent such that a material transformation that has taken place beforehand has no effect on the absorption in the case of a modification produced directly thereafter for the same linear shape. This therefore results in a points pattern, or the linear shape is formed by a points pattern.

According to a further preferred embodiment, the distance between two directly adjacent linear shapes in each case is less than 50 µm, in particular less than 40 µm or less than 30 µm or less than 25 µm or less than 20 µm or less than 15 µm or less than 10 µm. This solution is advantageous because it creates a crack front which imparts a characteristic shape to the exposed surface of the remaining residual solid body and the exposed surface of the separated solid body layer. This characteristic shape preferably forms zigzag-shaped elevations and/or depressions on the solid body layer and/or on the residual solid body. This applies to all solid bodies of which the crystal planes and/or slip planes, i.e. preferred crack planes, are inclined with respect to the first surface, through which the laser radiation is introduced into the solid body.

According to a further preferred embodiment, a first part of the modifications produced in the solid body is produced during a first relative movement of the solid body with respect to an optics of the laser, and a second part is produced during a second relative movement of the solid body with respect to the optics of the laser. The first relative movement is in this case preferably a straight-line movement in a first direction, and the second relative movement is in this case preferably a straight-line movement in a second direction, with the traversal pathways preferably being parallel to one another. Preferably, the entire travel pathway forms a meander shape, or a travel movement brought about by an X-Y table.

According to a further preferred embodiment, at least the setting of one laser parameter, in particular the polarization, during the first relative movement deviates from the setting during the second relative movement, with the first relative movement corresponding to a linear movement in a first direction and the second relative movement corresponding to a linear movement in a second direction, where the first direction and the second direction are oriented with parallel offset in relation to one another.

According to a further preferred embodiment, the laser radiation is linearly polarized or elliptically polarized or circularly polarized. This embodiment is advantageous because a defined polarization of the laser radiation allows modifications that make very short crack propagation of the subcritical cracks possible—in particular shorter than 100 µm—to be produced.

According to a further preferred embodiment, the method likewise preferably comprises the step of altering a beam property of the laser beams before penetration of the solid body, where the beam property is the intensity distribution at the focus, where the alteration or adaptation of the beam property is brought about by at least or exactly one spatial light modulator and/or by at least or exactly one DOE, with the spatial light modulator and/or the DOE being arranged in the beam path of the laser radiation between the solid body and the radiation source.

According to a further preferred embodiment, a diffractive optical element (DOE) is arranged before the penetration of the laser radiation into the donor substrate or into the solid body in the path of the laser radiation. The DOE divides up the laser radiation over a plurality of light paths in order to produce a plurality of focuses. The DOE preferably brings about over a length of 200 µm an image field curvature which is less than or equal to 50 µm, in particular less than or equal to 30 µm or less than or equal to 10 µm or less than or equal to 5 µm or less than or equal to 3 µm, with the DOE producing at least 2 and preferably at least or exactly 3 or at least or exactly 4 or at least or exactly 5 or at least or exactly or up to 10 or at least or exactly or up to 20 or at least or exactly or up to 50 or up to 100 focuses at the same time for altering the material properties of the donor substrate or solid body. This embodiment is advantageous because a significant acceleration of the process can be achieved.

It has therefore been recognized that, with diffractive optical elements (DOEs), high powers are divided among a number of foci in the focal plane. DOEs exhibit interference phenomena even before the focal plane; it has been recognized that interferences at the surface before the focal plane may produce local intensity maxima, which can lead to damage to the surface and may result in reduced transmissivity for laser radiation for depth working. It has also been recognized that some materials (for example: SiC) have local differences in refractive index and in other material properties (for example absorption, transmission, scattering), for example as a result of the material doping (frequent occurrence: doping spot). It has also been recognized that, depending on the surface roughness of the material at the surface of laser incoupling, the wavefront of the laser in the depth of the material may be significantly impaired, causing the focus to have reduced intensity (lower multiphoton transition probability), which would again lead to higher intensities, with the aforementioned problems.

Irradiating the laser beams onto or into the solid body or the donor substrate at the Brewster angle is complicated and may be challenging, since the different beam components travel pathways of differing length in the higher-index medium. The focus must accordingly be adapted by higher energy and/or by beam shaping. The beam shaping is preferably performed here for example by way of one or more diffractive optical elements (DOEs), which compensates for this difference dependently over the laser beam profile. The Brewster angle is relatively large, which with a high numerical aperture imposes requirements on the optics and its dimensions and also working distance. Nevertheless, this solution is advantageous, since reduced reflections at the surface also contribute to reduced surface damage because the light intensity is coupled into the material better. In the sense of the present subject matter, it is also the case in all of the other embodiments disclosed in this specification that laser beams can be irradiated at the Brewster angle, or predominantly or for the most part at the Brewster angle. With regard to Brewster angle incoupling, reference is hereby made to the document "Optical Properties of Spin-Coated TiO2 Antireflection Films on Textured Single-Crystalline Silicon Substrates" (Hindawi Publishing Corporation International Journal of Photoenergy, Volume 2015, Article ID 147836, 8 pages, http://dx.doi.org/10.1155/2015/147836). This document is incorporated by reference in its entirety to become subject matter of the present patent application. The aforementioned and incorporated document discloses in particular calculations of the ideal irradiation angle for various materials and therefore refractive indices. The energy of the laser or of the laser-applying device is adapted not so much in dependence on the material, but rather on the possible transmission at a certain angle. If, therefore, the optimum transmission is 93%, for example, then these losses must be taken into account with respect to experiments with perpendicular irradiation and losses then of for example 17%, and the laser power must be adapted accordingly.

An example: 83% transmission perpendicularly as compared with 93% at an angle means that, to achieve the same energy at depth, only 89% of the laser power used in the case of perpendicular irradiation is required (0.83/0.93=0.89). In the sense of the present subject matter, therefore, the part of the oblique irradiation preferably serves for reducing light loss caused by surface reflection, and for bringing more light into the depth. One possible subsequent problem to which this may give rise in certain scenarios is that the focus in the depth may acquire a "skewed" profile, with the consequence that the intensities achieved—the key variable for multiphoton working—are again lower, and hence possibly lower even than in the case of perpendicular irradiation, where all of the beam components travel the same optical pathway in the material. This may then preferably take place by a diffractive optical element or by a number of diffractive elements or by a continuous wedge or a number of continuous wedges—and/or other optical elements—in the beam path, which compensate these additional pathways and/or the influence on the individual beams—especially different spherical aberrations over the beam profile. These DOEs can be numerically calculated with suitable software solutions (for example Virtuallab from Lighttrans, Jena) and then fabricated or provided.

According to a further preferred embodiment, the modifications are preferably produced by means of a multiphoton excitation, in particular a two-photon excitation.

The method may comprise one or more, or all, of the following steps:

moving the solid body in relation to a laser-applying device, successively producing a multiplicity of laser beams by means of the laser-applying device, for in each case producing at least one modification, where the laser-applying device is set, in particular continuously, in dependence on at least one parameter, in particular a multiplicity of parameters, for defined focusing of the laser beams and/or for adapting the laser energy.

The LASER beam preferably penetrates into the donor substrate via a planar surface of the donor substrate. The LASER beam is preferably inclined with respect to the surface, in particular planar surface, of the donor substrate or solid body in such a way that it penetrates into the donor substrate at an angle unequal to 0° or 180° with respect to the longitudinal axis of the donor substrate. Preferably, the LASER beam is focused for producing the modification in the donor substrate.

The solid body preferably has crystal lattice planes that are inclined with respect to a planar major surface, with the major surface of the solid body forming one boundary in the longitudinal direction of the solid body, where a crystal lattice plane normal is inclined in a first direction with respect to a major-surface normal, the modifications being alterations of the material property of the donor substrate. Altering the material property forms a linear shape, at least in portions, by changing the location of penetration of the laser radiation in the solid body, it being possible for the linear shape to be formed as a dotted line, dashed line or continuous line. Preferably, the linear shape or a number of linear shapes, or all or the majority of the linear shapes, have a length of more than 1 mm or of more than 5 mm or of more than 10 mm or of more than 20 mm or of more than 30 mm or a length of up to 1 mm or of up to 5 mm or of up to 10 mm or of up to 20 mm or of up to 30 mm or of up to 50 mm or of up to 100 mm. The alterations of the material property are preferably produced on a production plane, in particular at least one production plane or exactly one production plane. Preferably, the crystal lattice planes of the solid body are aligned in an inclined manner with respect to the production plane. The linear shapes are preferably inclined with respect to an intersecting line obtained at the intersection between the production plane and the crystal lattice plane, in particular at an angle, in particular between 2° and 30°, in particular at an angle between 3° and 9° or at an angle of at least or exactly or up to 3° or at an angle of at least or exactly or up to 4° or at an angle of at least or exactly or up to 5° or at an angle of at least or exactly or up to 6° or at an angle of at least or exactly or up to 7° or at an angle of at least or exactly or up to 8° or at an angle of exactly or up to 15°.

According to a further preferred embodiment, the laser radiation is generated with pulse lengths of less than 5 ns or less than 2 ns, in particular of less than 1 ns or of less than 700 ps or of less than 500 ps or of less than 400 ps or of less than 300 ps or of less than 200 ps or of less than 150 ps or of less than 100 ps or of less than 50 ps or of less than 10 ps.

Alterations of the material property, or modifications, are preferably produced in each case with laser pulses which are shorter than 5 ns, in particular shorter than 2 ns or 1 ns. Particularly preferably, the temporal duration of the individual laser pulses is between 50 ps and 4000 ps or between 50 ps and 2000 ps or between 50 ps and 1000 ps, in particular between 50 ps and 900 ps or between 50 ps and 700 ps or between 50 ps and 500 ps or between 50 ps and 300 ps or between 300 ps and 900 ps or between 500 ps and 900 ps or between 700 ps and 900 ps or between 300 ps and 500 ps or between 500 ps and 700 ps or between 300 ps and 700 ps or shorter than 900 ps or shorter than 700 ps or shorter than 500 ps or shorter than 300 ps or shorter than 100 ps or shorter than 50 ps.

According to a further preferred embodiment, the laser radiation is generated with pulse energies, where the pulse energies are between 100 nJ and 1 mJ or 500 nJ and 100 µJ or 1 µJ and 50 µJ. The pulse energy per individual shot is preferably 0.1-50 µJ after the objective or after the last optical preparation means and before the penetration of the laser radiation into the solid body. Should a number of focuses be produced by means of a DOE, for example, the laser radiation assigned to each individual focus after the objective or after the last optical preparation means and before the penetration of the laser radiation into the solid body has a pulse energy of 0.1-50 µJ.

According to a further preferred embodiment, for the purpose of defined thermal conditioning and/or for producing the modification and/or for altering, in particular for locally altering, a material property of the donor substrate, the LASER radiation is introduced into the solid body with a pulse density of between 0.1 nJ/µm2 and 10 000 nJ/µm2, preferably between 1 nJ/µm2 and 1000 nJ/µm2, and particularly preferably between 3 nJ/µm2 and 200 nJ/µm2.

According to a further preferred embodiment, initiating modifications for initiating subcritical cracks are produced, where at least one process parameter for producing the initiating modifications is different from at least one process parameter for producing the basic modifications; preferably, a number of process parameters are different from one another. Additionally or alternatively, the initiating modifications may be produced in a direction which is at a distance from or inclined in relation to the running direction of the line along which the basic modifications are produced.

The subcritical cracks, produced in particular by initiating modifications and/or by modifications defining the detachment range or the detachment plane, or by modifications forming a linear shape, preferably propagate less than 5 mm, in particular less than 3 mm or less than 1 mm or less than 0.5 mm or less than 0.25 mm or less than 0.1 mm. An inclined alignment here may correspond for example to an angle of between 0° and 90°, preferably an angle of between 85° and 90°, particularly preferably an angle of 90°.

This is a threshold process, triggered when a critical intensity (i.e. power/area) is exceeded. In other words, short pulses require less energy/pulse; a higher numerical aperture concentrates the energy to a smaller point, therefore also requiring lower energy to achieve the threshold intensity.

The method preferably likewise comprises one or more of the following steps: providing the donor substrate and/or providing a donor substrate (or solid body) which comprises crystal lattice planes that are inclined with respect to a planar major surface. The major surface of the donor substrate is in this case preferably forming one boundary in the longitudinal direction of the donor substrate, where a crystal lattice plane normal is inclined in a first direction with respect to a major-surface normal. Providing at least one laser. Introducing laser radiation of the laser into the interior of the solid body, preferably via the major surface, to alter the material properties of the solid body in the region of at least one laser focus. The laser focus is preferably formed by laser beams of the laser emitted by the laser. Altering the material property forms a linear shape by changing the location of penetration of the laser radiation into the donor substrate. The alterations of the material property are preferably produced on a production plane, which preferably runs parallel to the major surface. The linear shape preferably extends in a straight or curved line, at least in portions. The crystal lattice planes of the donor substrate are preferably aligned in an inclined manner with respect to the production plane. The linear shape, in particular at least the portion extending in a straight line or the portion extending in a curved line, is inclined with respect to an intersecting line obtained at the intersection between the production plane and the crystal lattice plane, and consequently the altered material property causes cracking of the donor substrate in the form of subcritical cracks. The step of separating the solid body layer is preferably performed by introducing an external force into the donor substrate in order to connect the subcritical cracks, or sufficient material on the production plane to detach the solid body layer from the donor substrate, while connecting the subcritical cracks, is altered by means of the laser radiation. The major surface is preferably regarded/defined here as an ideally planar surface.

This method is advantageous because crack growth perpendicularly to the writing direction is restricted owing to the fact that the linear shape is inclined with respect to an intersecting line obtained at the intersection between the production plane and the crystal lattice plane. The modifications per writing line are therefore not produced in the same crystal lattice planes. For example, the first 1-5% of the modifications per writing line may consequently intersect only a fraction, in particular less than 75% or less than 50% or less than 25% or less than 10% or no crystal lattice planes, of the last 1-5% of the modifications of the same writing line. The writing line here is preferably longer than 1 cm or longer than 10 cm or longer than 20 cm or up to 20 cm long or up to 30 cm long or up to 40 cm long or up to 50 cm long. Therefore, significantly fewer modifications per writing line are produced in the same crystal lattice planes, thereby limiting crack propagation along these crystal lattice planes. Inclined should be understood here as meaning nonparallel or nonsuperposing, and may therefore be present, for example, from an angle of just 0.05°; even at very small angles, in particular below 1°, crystal lattice planes different from one another over the length of extent of the linear shape, in particular slip planes, are locally cut or modified or altered by the modification or modifications.

This leads to a second advantage, to be specific that the writing direction need not necessarily be implemented in such a way that the further cracks produced have to be superposed on the cracks last produced. It is now also possible for the writing direction to be the opposite. This is so because, as a result of the possible shortness of the cracks, there is no shading by the cracks last taking place. This makes it possible, in spite of the opposite writing direction, to realize for example line spacings of less than 100 µm, in particular of less than 75 µm or of less than 50 µm or of less than 30 µm or of less than 20 µm or of less than 10 µm or of less than 5 µm or of less than 2 µm.

Alteration of the material property may preferably be understood here as referring to the production of a material modification or the production of a crystal lattice defect, in particular the bringing about of a locally restricted phase change.

According to a first preferred embodiment, the linear shape or writing line is inclined with respect to the intersecting line in an angle range between 0.05° and 87°, in particular in an angle range between 3° or 5° and 60° and preferably between 10° and 50°, in particular between 10° and 30°, such as for example between 12° and 20° or between 13° and 15°, or between 20° and 50°, in particular between 25° and 40° or between 30° and 45° or between 28° and 35°. This solution is advantageous since the inclination is such that a sufficiently large number of different crystal lattice planes are a constituent of each further modification of the same linear shape or writing line.

According to a further preferred embodiment, a sufficient amount of material of the donor substrate is altered, while forming a linear shape or a number of linear shapes, that the ends of the individual crystal lattice planes, exposed as a result of separation of solid body layers, and the material alterations produce moiré patterns, for which purpose a multiplicity of material alteration regions that extend linearly and preferably in a straight line and are aligned parallel to one another are produced.

A linear shape is preferably regarded here as a set of points that forms a straight or curved line. The distances between the centers of the individual points are preferably less than 250 μm, in particular less than 150 μm or less than 50 μm or less than 15 μm or less than 10 μm or less than 5 μm or less than 2 μm, from one another.

Preferably a number of linear shapes are produced on the same production plane; preferably, at least a number of the linear shapes are arranged at the same distance from one another. The linear shapes may preferably have the form of arcs, in particular circular arcs, or of straight lines.

According to a further preferred embodiment, the method may comprise the step of moving the solid body in relation to the laser, with the laser being set for defined focusing of the laser radiation and/or for adaptation of the laser energy, preferably continuously, in dependence on at least one parameter and preferably a multiplicity of parameters, in particular at least two parameters, with one parameter preferably being the degree of doping of the solid body at a predetermined location or in a predetermined region, in particular in the interior, of the solid body, in particular at a distance from the surface of the solid body.

According to a further preferred embodiment, an additional or alternative parameter is the degree of doping of the material of the solid body, which is preferably determined by the analysis of backscattered light (preferably Raman scattering), where the backscattered light has a different wavelength or a different wavelength range than light irradiated in a defined way for triggering the backscattering; a Raman instrument is preferably a constituent of the apparatus, and the degree of doping is preferably determined by means of the Raman instrument; one or more or all of these parameters is/are captured, in particular simultaneously, preferably by means of a common detection head. Raman spectroscopy is preferably likewise used in the case of glasses, sapphire or aluminum oxide ceramic. The Raman method is advantageous because it measures in the depth of the material, but only from one side, does not require high transmission, and, by means of a fit to the Raman spectrum, yields the charge carrier density/doping, which can be correlated with the laser parameters.

According to a further preferred embodiment, an additional or alternative parameter is the degree of doping of the solid body at a predetermined location or in a predetermined region, in particular in the interior, of the solid body, in particular at a distance from the surface of the solid body. The degree of doping is preferably linked with location information in such a way as to create a treatment card or provide location-resolved treatment instructions, which location-dependently specifies or specify the laser parameters, in particular the laser focus and/or laser energy, and/or further machine parameters, in particular the rate of advancement.

According to a further preferred embodiment, the degree of doping is determined by the analysis of backscattered light with an inelastic scattering (Raman scattering), where the backscattered light has a different wavelength or a different wavelength range than light irradiated in a defined way for triggering the backscattering, with the backscattered light being backscattered from the predefined location or from the predetermined region.

This embodiment is advantageous because, in the laser process, in particular on SiC (though also other materials), the process must be conducted in a manner adapted to the location (for example different laser energy, etc.). It has been recognized that, for example in the case of SiC, the doping is particularly critical for this, since it changes the transparency of the material to the working wavelength and necessitates higher laser energies.

According to a further preferred embodiment, the degree of doping is determined by means of an ellipsometric measurement (for example Müller matrix ellipsometry with back-side reflection). The ellipsometric measurement is preferably based on an optical transmission of the material.

According to a further preferred embodiment, the degree of doping is determined by means of a purely optically calibrated transmission measurement, the calibration being brought about by means of Hall measurement and 4-point measurement. This method can likewise ascertain the doping/number of free charge carriers in the material, which then allows the laser energy required for the process to be determined.

According to a further preferred embodiment, the degree of doping is determined by means of an eddy current measurement, with differences in conductivity in the material of the solid body preferably being determined and evaluated.

With eddy current measurements or when using eddy current sensors or in the eddy current measuring technique, a transmitting and receiving coil is preferably used in order to detect local differences in conductivity. In the transmitting coil, a radiofrequency electromagnetic primary alternating field is generated. In the conductive material, eddy currents (locally flowing currents) are then induced, in turn causing an oppositely directed secondary electromagnetic alternating field. The superposing of these fields can be measured, separated and evaluated. Hence it is possible to measure various quality features (layer thickness, layer resistance, homogeneity of material) principally of thin conductive layers, though also of bulk material. In transmission arrangement (test body between transmitting coil and receiving coil), optimum resolutions are achieved; however, the arrangement of both coils on one side of the sample is also possible for reflection measurements. By adapted design of the coils and selection of frequency it is possible to use different depths of penetration and sensitivities.

There are therefore fundamentally many measurement methods by which the doping can in principle be measured. Important here is a rapid, contactless, nondestructive method.

A first parameter here may be the average refractive index of the material of the donor substrate or the refractive index of the material of the donor substrate in the region of the donor substrate through which laser radiation must pass in order to produce a defined alteration of material and a second or alternative first parameter here may be the depth of working in the region of the donor substrate through which laser radiation must pass in order to produce a defined alteration of material. The first parameter is preferably determined by means of a refractive index determination means, in particular by means of spectral reflection, and/or the second parameter is preferably determined by means of a topography determination means, in particular by means of a confocal-chromatic distance sensor.

According to a further preferred embodiment, a first parameter is the average refractive index of the material of the solid body or is the refractive index of the material of the solid body in the region of the solid body through which laser beams must pass in order to produce a defined modification, or is the transmission of the solid body at defined locations of the solid body, and preferably for a defined solid body depth. According to a further preferred embodiment, a second or alternative first parameter is the working depth in the region of the solid body through which laser beams must pass in order to produce a defined modification. According to a further preferred embodiment, the first parameter is determined by means of a refractive index determination means, in particular by means of spectral reflection, and/or the second parameter is determined by means of a topography determination means, in particular by means of a confocal-chromatic distance sensor. According to a further preferred embodiment, a first parameter is the direction of advancement in which a linear shape is formed as a consequence of modifications in the production plane, in particular an outward and/or return journey. Consequently, a first parameter may represent the laser parameters in the case of an outward journey and a second parameter may represent the laser parameters in the case of a return journey, in particular in the case of meanderlike working by means of an X-Y table.

According to a further preferred embodiment, data on the parameters, in particular on the first parameter and on the second parameter, are provided in a data storage device and, at least before the production of the material alteration, are fed to a control device, where the control device sets the laser in dependence on the respective location of the material alteration to be produced; for setting the laser, the control device preferably likewise processes distance data relating to a distance parameter, with the distance parameter reproducing the distance of the respective location at which laser radiation for the production of the material alteration is introduced into the donor substrate at the time of the material alteration, with respect to the laser, the distance data being captured by means of a sensor device.

According to a further preferred embodiment, data on the parameters, in particular on the first parameter and on the second parameter, are provided in a data storage device, and, at least before the production of the modifications, are fed to a control device, with the control device setting the laser-applying device in dependence on the respective location of the modification to be produced.

The aforementioned object is likewise achieved by a method for separating at least one solid body layer from a solid body. The method preferably comprises the following steps: carrying out a method described herein for producing modifications in a solid body and the step of introducing an external force into the solid body for producing stresses in the solid body and/or the step of producing an internal force in the solid body, with the external and/or internal force being so strong as to result in crack propagation along the detachment region. A major crack connecting the subcritical cracks is brought about or initiated by the internal and/or external force.

According to a further preferred embodiment, to introduce the external force, an acceptor layer is arranged on an exposed surface of the solid body layer to be separated, where the acceptor layer comprises a polymer material, in particular PDMS, and, in order to produce stresses, in particular mechanically produce stresses, in the solid body, a thermal action is applied to the acceptor layer, where the thermal action takes the form of a cooling of the acceptor layer to a temperature below the ambient temperature, in particular to a temperature below 0° or to a temperature below −10° or to a temperature between −20° and −200° C., where the cooling takes place such that the polymer material of the acceptor layer undergoes a glass transition and where, as a result of the stresses, a crack that separates the first solid body layer from the solid body in the solid body propagates along the detachment region, and/or, in order to introduce the external force, sound, in particular ultrasound, is applied to the solid body and/or, in order to introduce the external force, a thermal action and/or machining action is applied to the peripheral surface of the solid body at the height of the detachment plane, and/or, in order to produce internal forces, such a number of modifications that the subcritical cracks connect to form a crack separating the solid body layer are produced in the interior of the solid body.

Furthermore, a subject matter relates to a solid body layer, in particular produced by a method described herein. The solid body layer or the wafer preferably comprises SiC or consists thereof. Preferably, the solid body layer forms a surface, the surface forming a topography, where the topography has elongated zigzag-shaped or wave-like elevations, the elongated zigzag-shaped or wave-like elevations extending for the most part and in each case as a whole in a direction or a number of directions that is/are different from a direction parallel to the crystal lattice planes and parallel to the surface, in particular inclined thereto at an angle of between 2° and 30°, in particular between 3° and 15°, in particular between 4° and 9°, the average height of the zigzag-shaped or wave-like elevations or the maximum height of the zigzag-shaped or wave-like elevations with respect to the deepest location of the surface being less than 100 μm, in particular less than 75 μm or less than 50 μm or less than 30 μm. In this case, preferably only a location that is at least 1 mm or at least 5 mm or at least 10 mm from the margin of the solid body layer or the wafer is regarded as the deepest location. The solid body layer is preferably a wafer separated from an SiC ingot or SiC boule.

This solution is advantageous because it produces a solid body layer of a surface structure that reduces or prevents the uncontrolled propagation of cracks.

Furthermore, the subject matter relates to a solid body layer, in particular produced by a method described herein. The solid body layer in this case preferably comprises SiC or consists thereof. The solid body layer forms a surface, phase-transformed material constituents being present as a constituent of the surface and along directions of extent that are parallel to one another and extend along the surface and are at a distance from one another, the directions of extent that are parallel to one another and at a distance from one another being inclined at an angle of between 2° and 30°, in particular between 3° and 15°, with respect to a direction that is oriented parallel to the crystal lattice planes and parallel to the surface. Preferably, the surface forms a topography, where the topography has elongated zigzag-shaped elevations, the elongated zigzag-shaped elevations extending for the most part and in each case as a whole in a direction or a number of directions that is/are different from a direction parallel to the crystal lattice planes and parallel to the surface, in particular inclined thereto at an angle of between 2° and 30°, in particular between 3° and 15°, in particular between 4° and 9°, the average height of the zigzag-shaped elevations or the maximum height of the zigzag-shaped elevations with respect to the deepest location of the surface being less than 100 µm, in particular less than 75 µm or less than 50 µm or less than 30 µm.

Further advantages, aims and properties of the subject matter described or of the subject matters described are explained with reference to the description which follows of appended drawings, in which the separating method is represented by way of example. Components or elements which are preferably used in the method and/or which coincide at least for the most part in terms of their function in the figures may be identified here by identical reference signs, there being no need for these components or elements to be numbered or explained in all of the figures.

Figure 4:
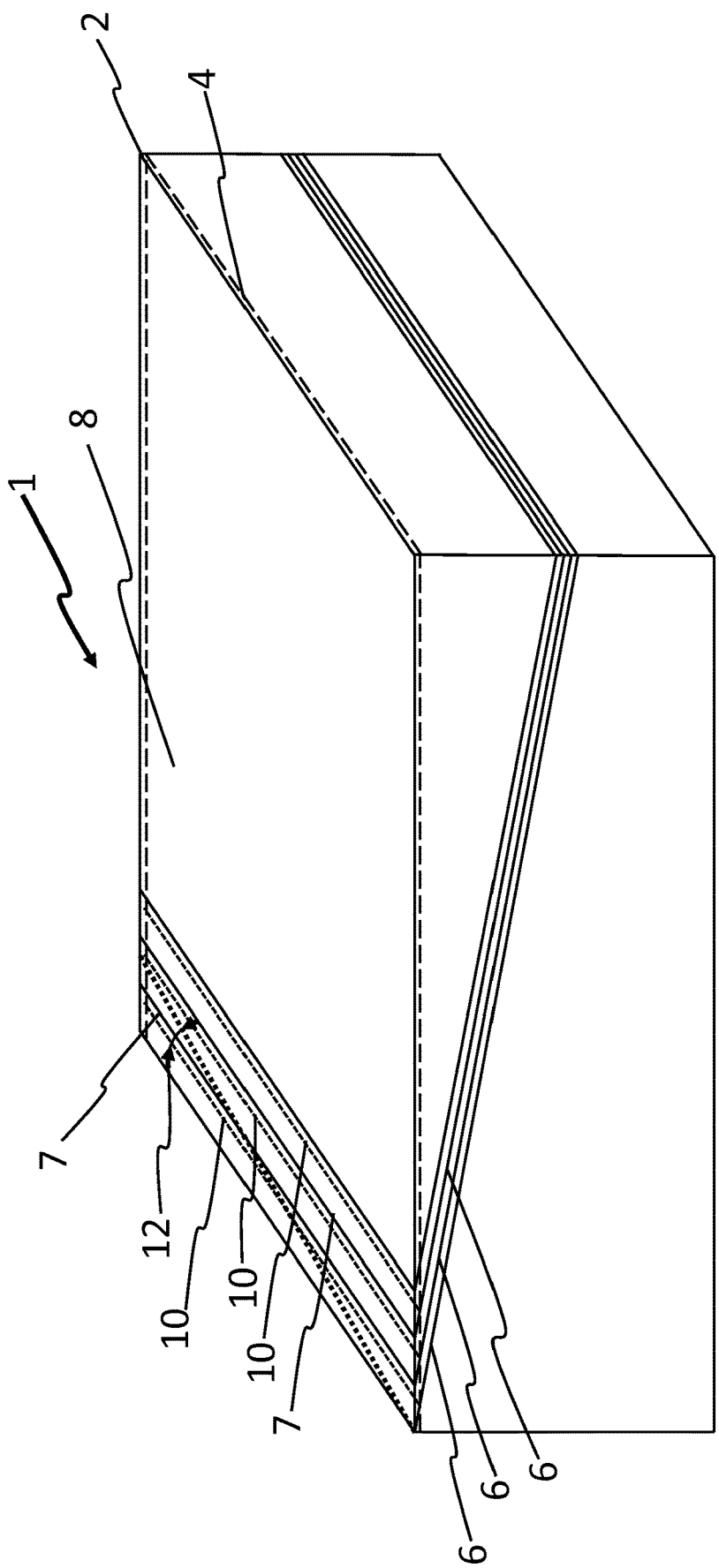
Figure 5:
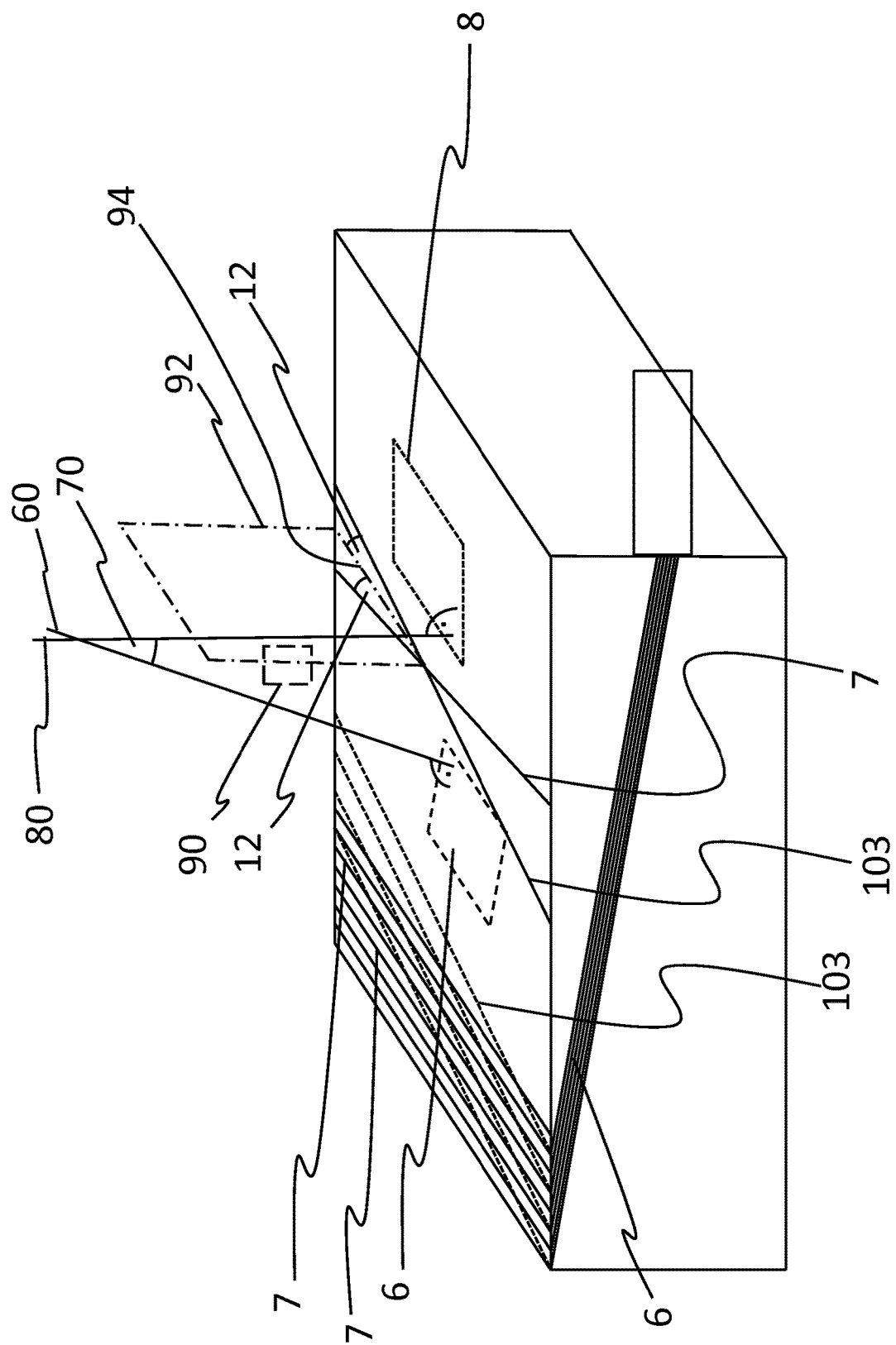
Figure 6:
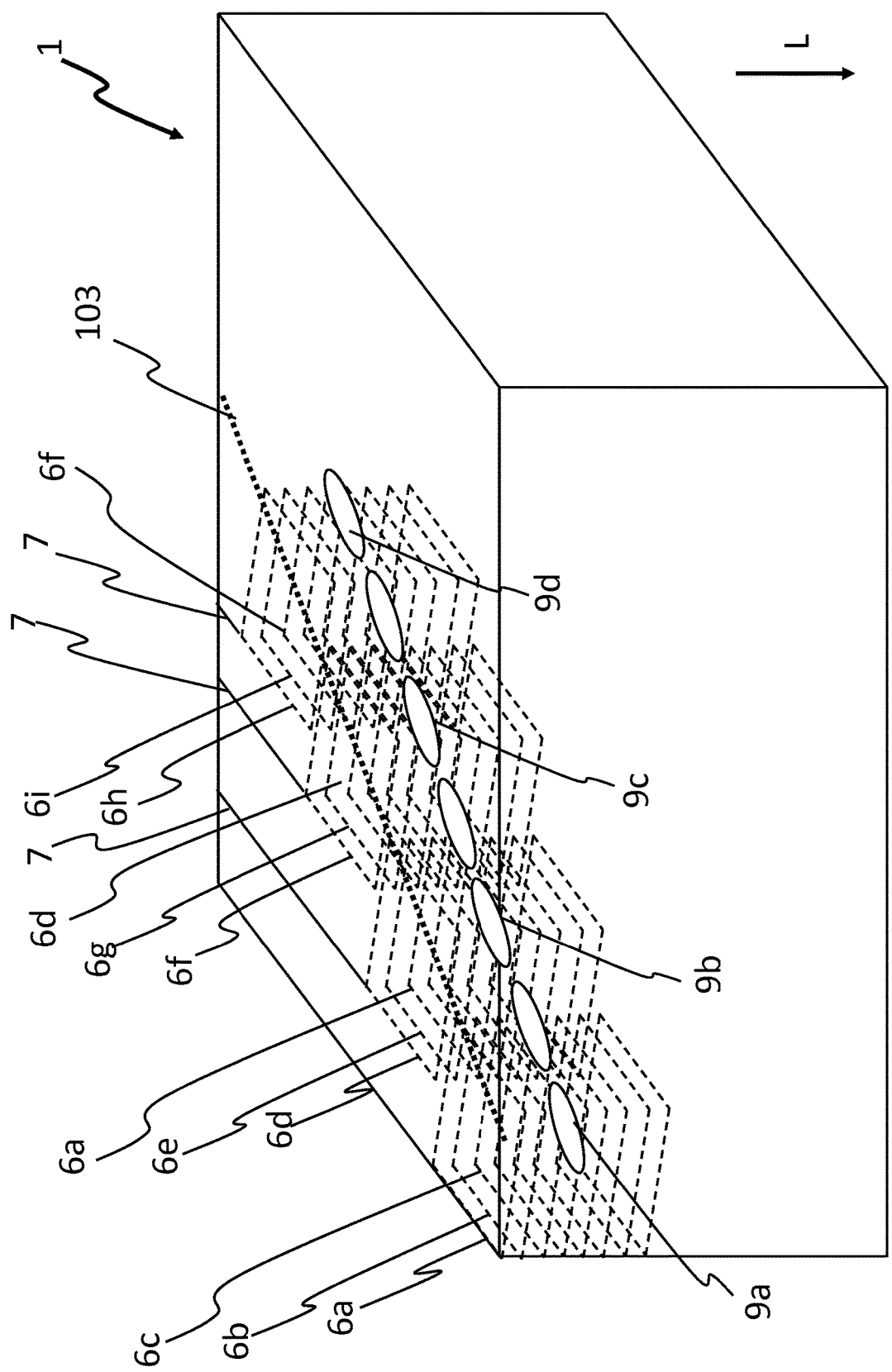
Figure 7:
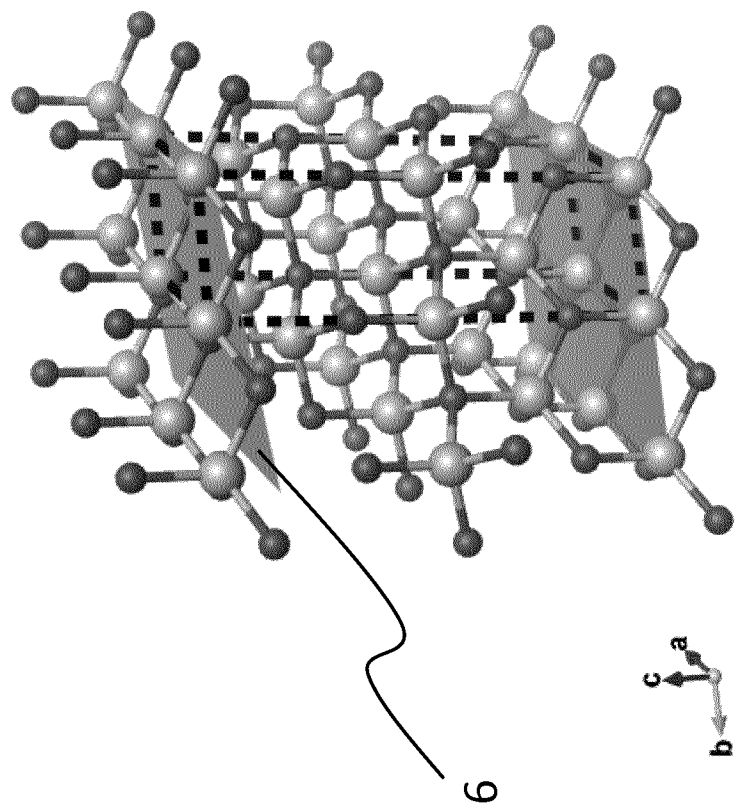
Figure 8C:
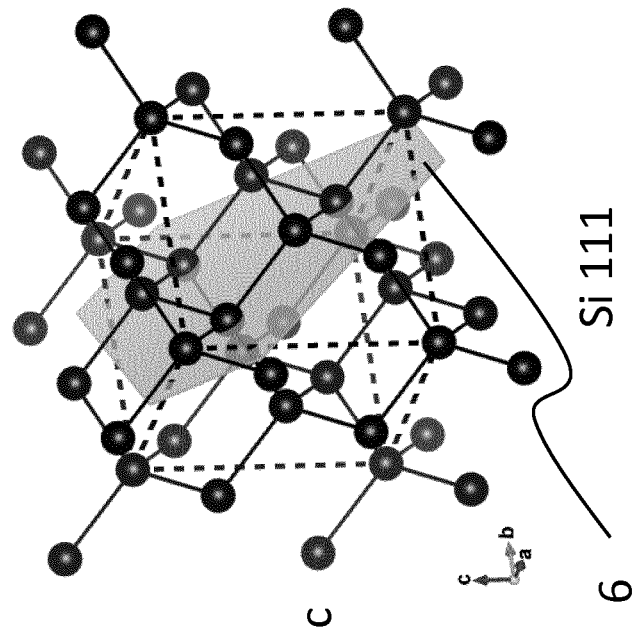
Figure 8A:
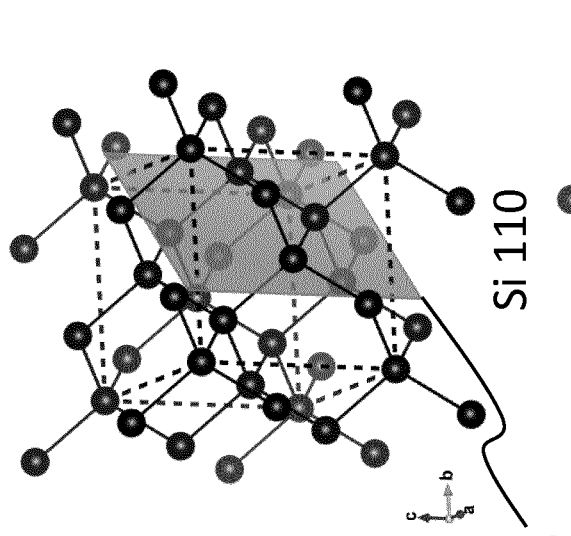
Figure 8B:
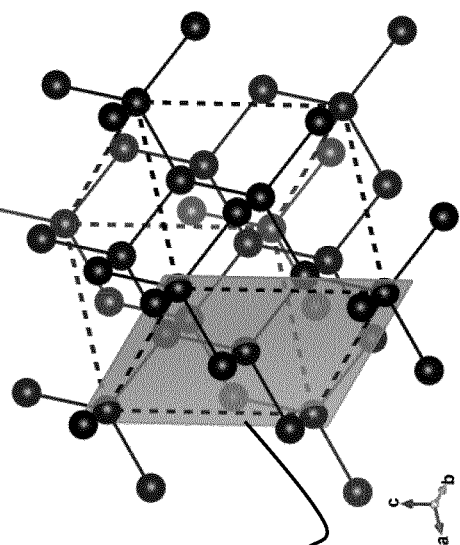
Figure 9B:
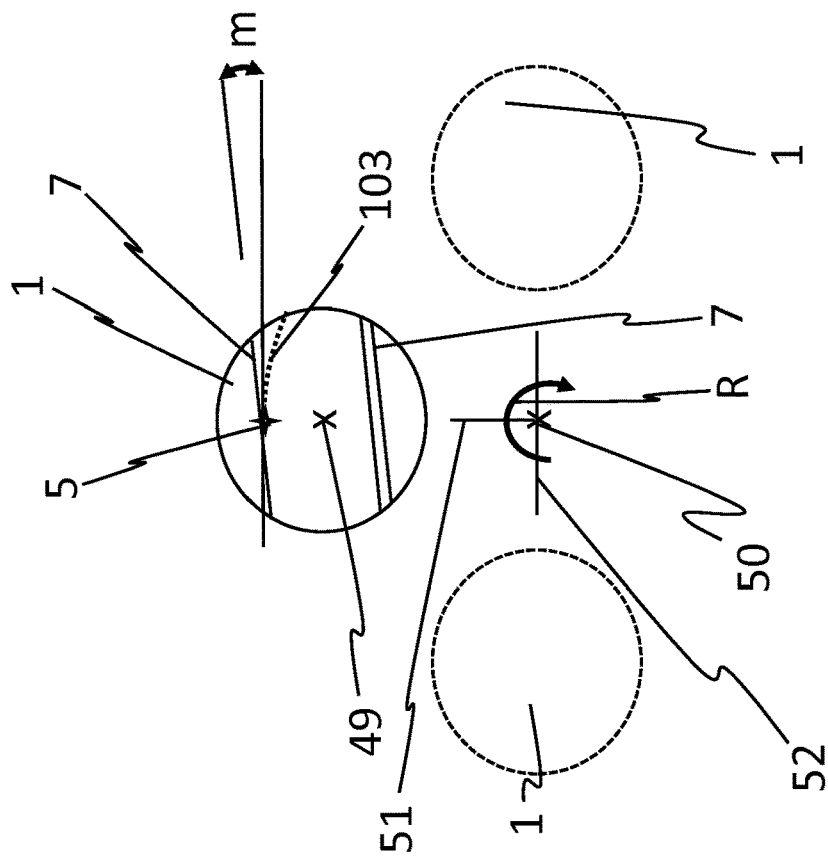
Figure 9A:
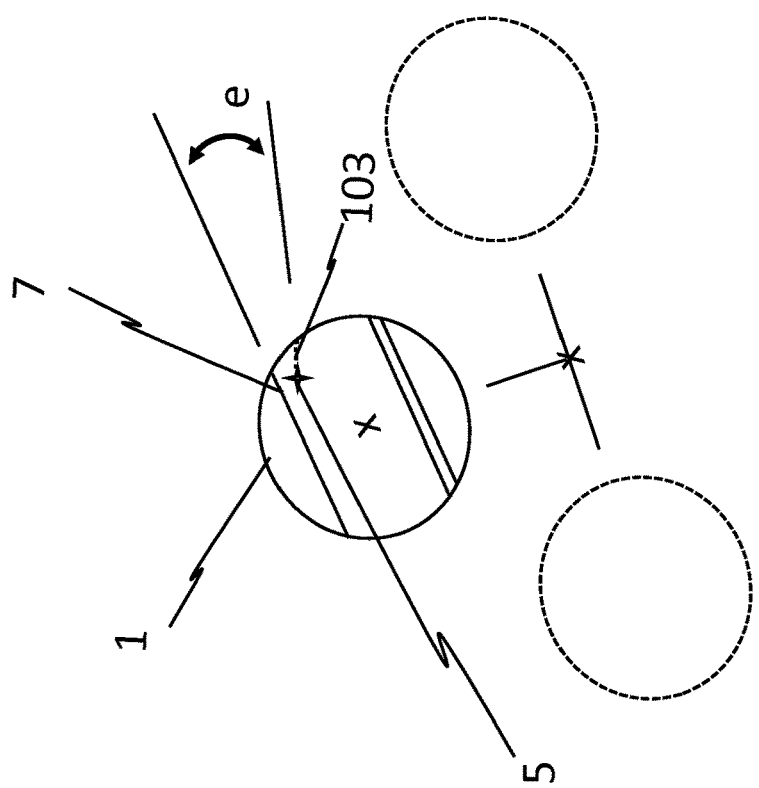
Figure 12:
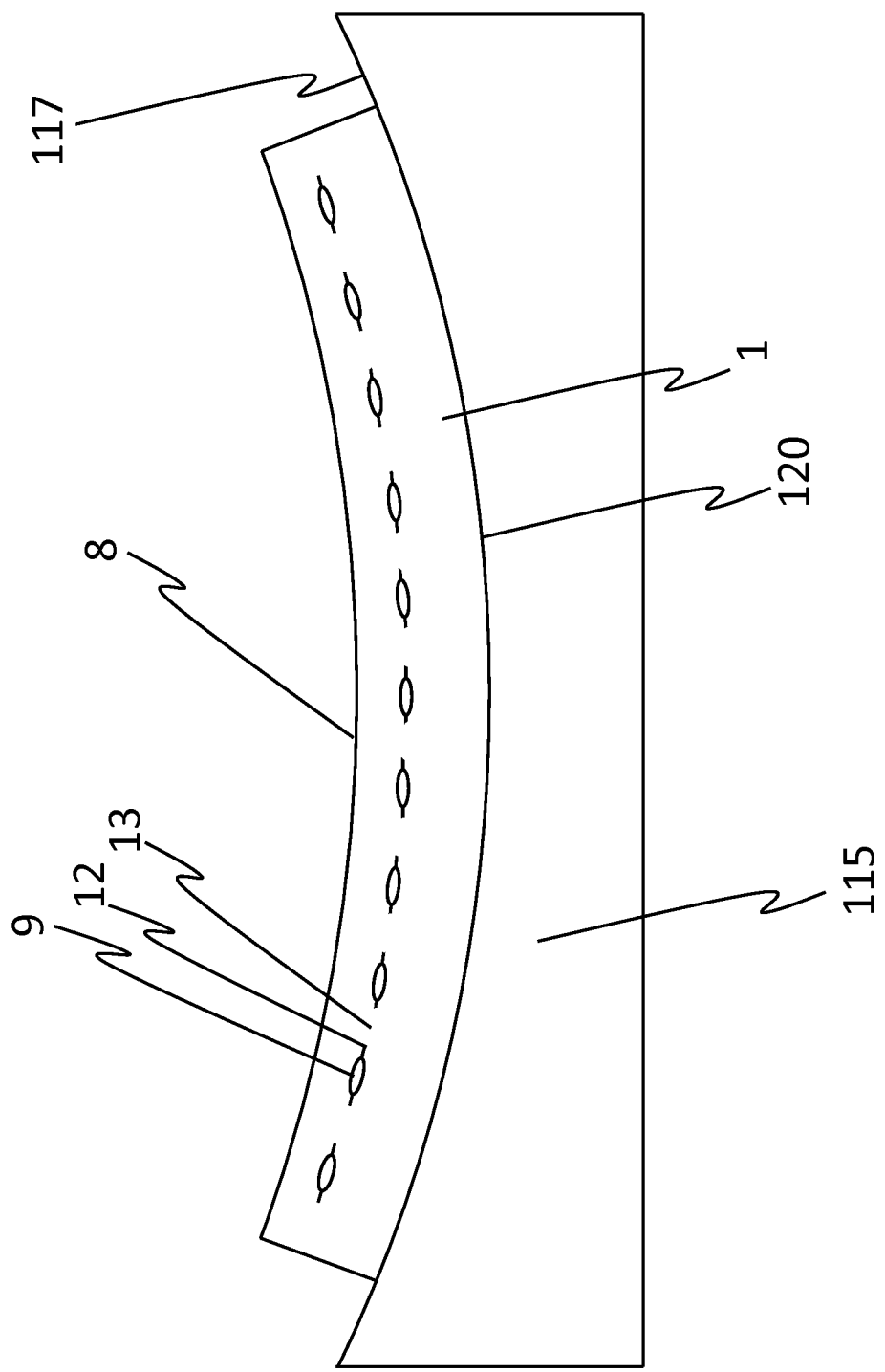
Figure 13:
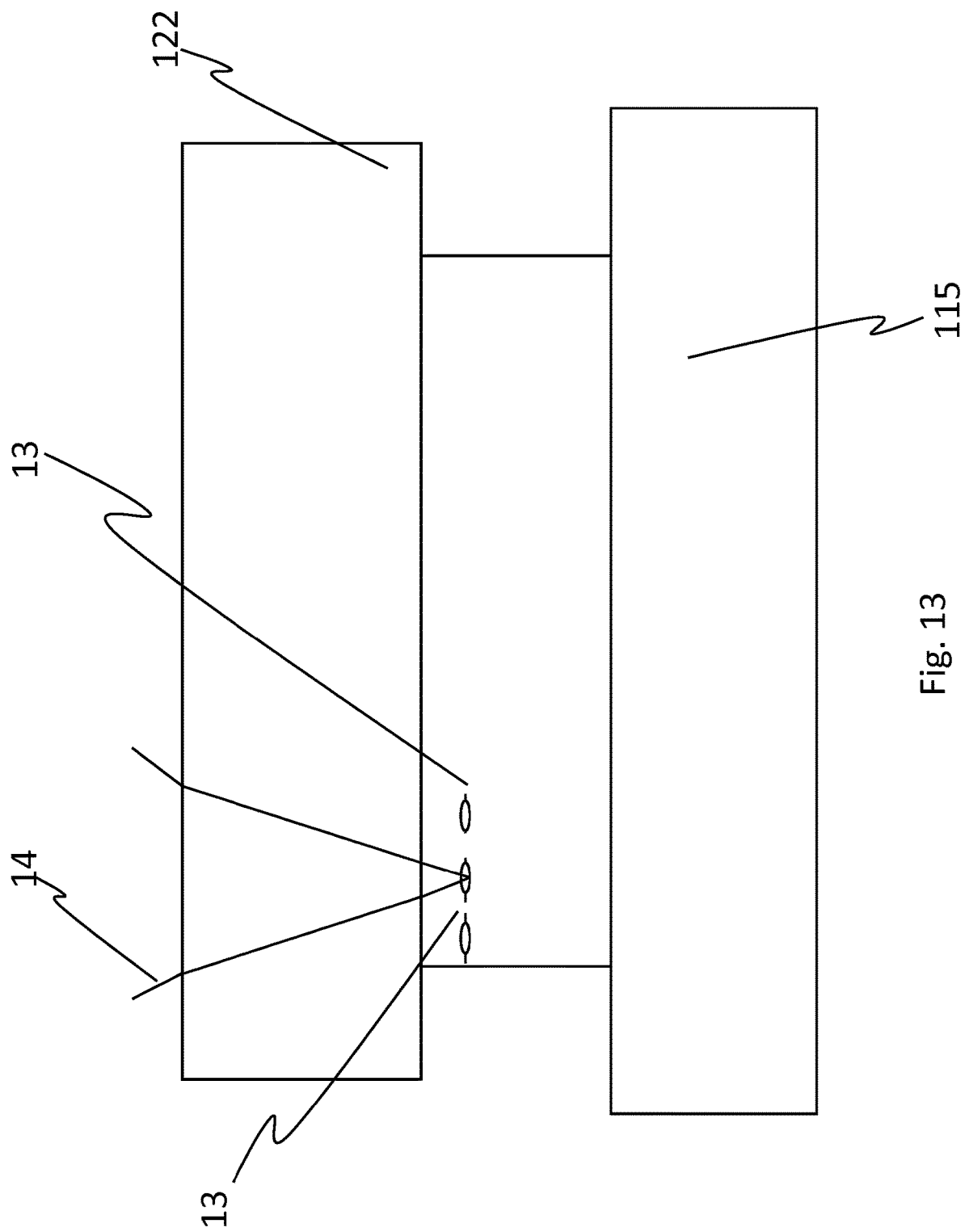
Figure 14B:
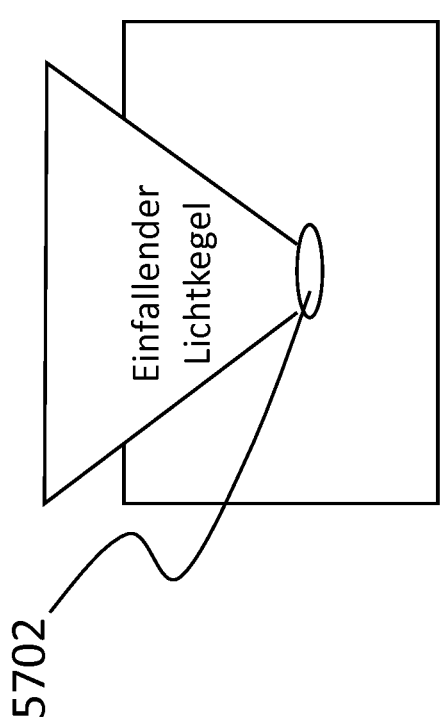
Figure 14C:
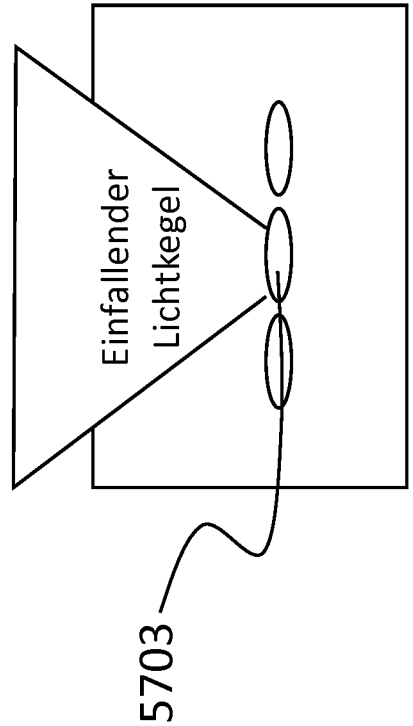
Figure 14A:
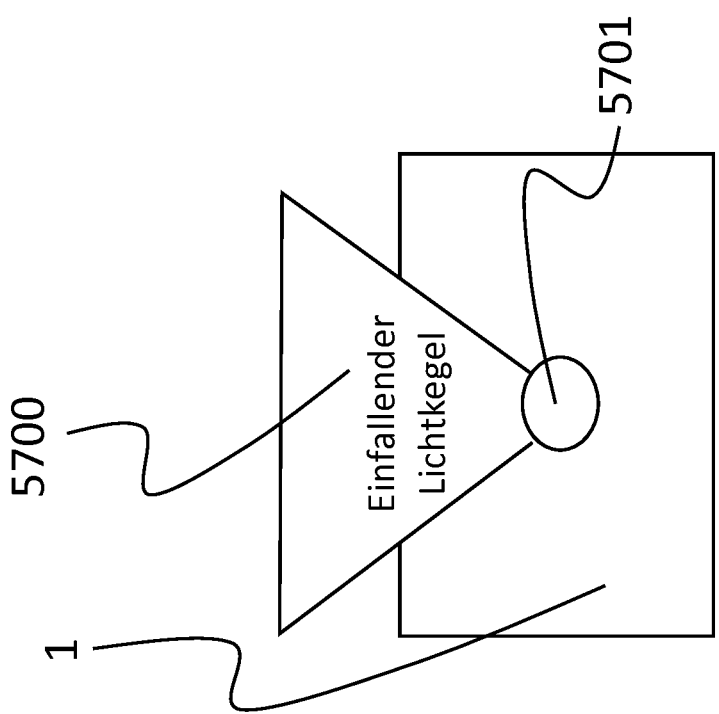

FIG. 2a-e show various exemplary representations of different polarizations,

FIG. 3a shows a third schematic representation of the relationship between a writing line and polarized laser radiation;

FIG. 3b shows a fourth schematic representation of the relationship between a writing line and polarized laser radiation;

FIG. 4 shows a donor substrate with crystal lattice planes aligned with respect to the longitudinal axis at an angle unequal to 90° and laser writing lines produced, FIG. 5 shows a further donor substrate with crystal lattice planes aligned with respect to the longitudinal axis at an angle unequal to 90° and laser writing lines produced, where the alignment of the laser writing lines or linear shape is defined by means of planes, FIG. 6 shows that the modifications of a linear shape intersect a multiplicity of different crystal lattice planes, FIG. 7 shows an example of a crystal lattice with a slip plane for 4HSiC, FIG. 8a shows an example of a crystal lattice with a slip plane 110 for Si, FIG. 8b shows an example of a crystal lattice with a slip plane 100 for Si, FIG. 8c shows an example of a crystal lattice with a slip plane 111 for Si, FIG. 9a-10a show the alteration in the inclination of the linear shape with respect to the ends of the crystal plane when the donor substrate is moved by means of a rotation device under a laser device, FIG. 10b shows a plan view of an exemplary rotation device, FIG. 10c shows a side view of a working system, where the working system has a laser element which can preferably be moved linearly, and has a rotation device with a multiplicity of donor substrates arranged thereon, FIG. 11a shows a schematic representation of the theoretical relationships of the formula (d−x)/x;

FIG. 11b shows a typical surface structure of a surface of a solid body of a separated solid body layer, FIG. 11c shows a representation of writing lines produced as a result of differently defined parameters, FIG. 11d shows various zigzag lines, FIG. 12 shows a schematic representation of a production of mechanical stresses in the interior of the solid body for the purpose of restricting the propagation of the subcritical cracks, FIG. 13 shows a further schematic representation of a production of mechanical stresses in the interior of the solid body for the purpose of restricting the propagation of the subcritical cracks, FIG. 14a-c show optical means for altering the laser beam properties.

Figure 1B:
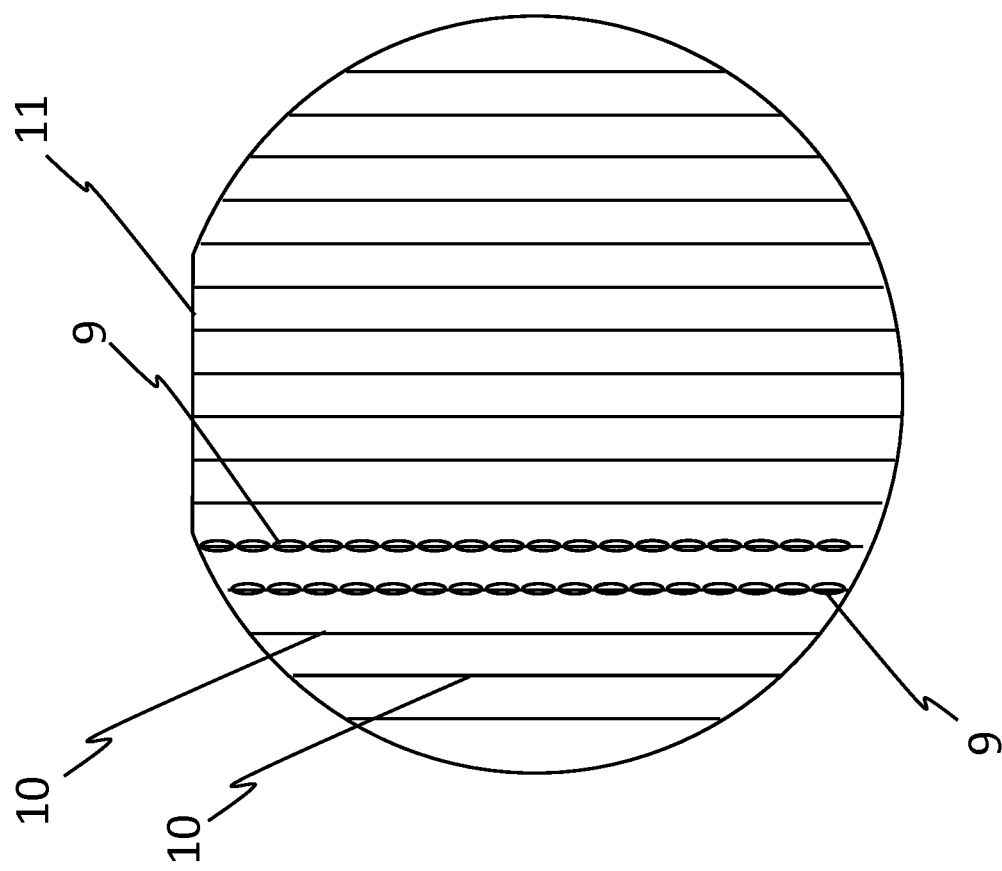
FIG. 1b shows a second schematic representation of the relationship between a writing line and polarized laser radiation.
Figure 1A:
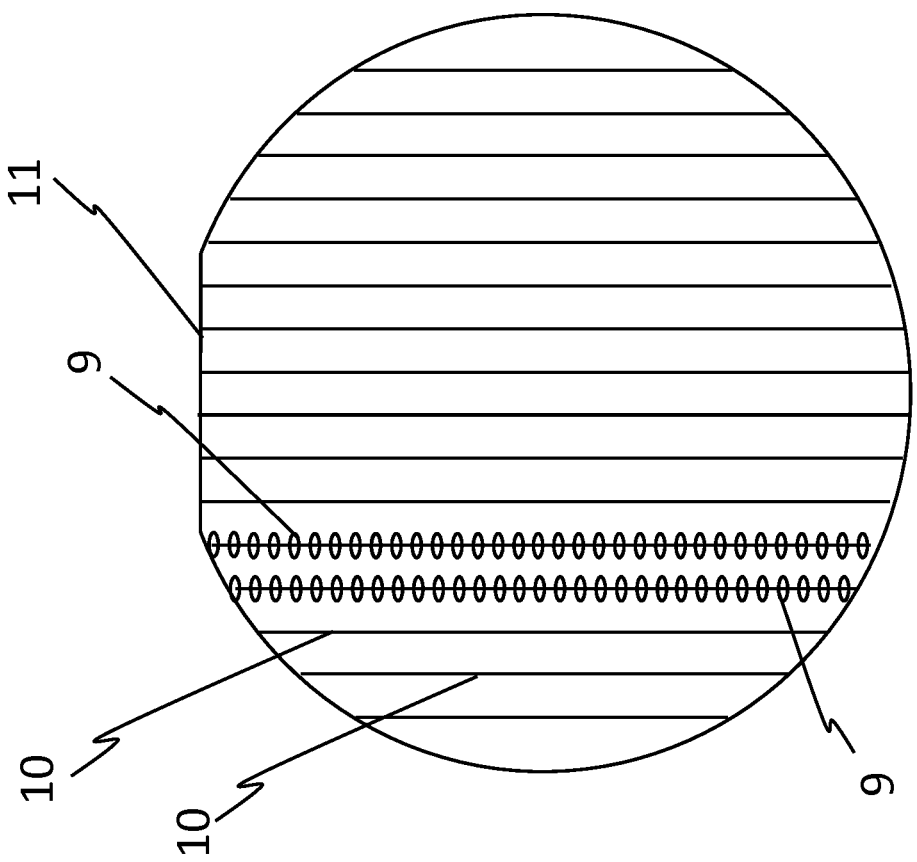
FIG. 1a shows a first schematic representation of the relationship between a writing line and polarized laser radiation.

FIG. 1a shows a schematic representation of a solid body 1 during a treatment, in particular the production of modifications 9 in the interior of the solid body 1. The modifications 9 represent phase transformations of the material of the solid body, in particular SiC, that are preferably produced by means of multiphoton excitation. According to this representation, the modifications 9 are produced in such a way that they are at a distance from one another. This solution is advantageous because, as a result, a modification 9 already produced does not alter or influence the absorption of the laser beams, or only slightly. The modifications 9 are preferably produced in the form of linear shapes or writing lines 103. The writing lines 103 are in this case preferably of a straight-line form. According to this representation, the writing lines 103 are preferably oriented parallel to the intersecting line 10. This intersecting line 10 is preferably a result of an intersection between the production plane 4 and the crystal lattice plane 6 (cf. FIG. 4). According to this representation, it can also be seen that the modifications 9 are always aligned in the same direction. This is a result of the defined polarization of the laser radiation. According to FIG. 1a, therefore, a first polarization is used, whereas according to FIG. 1b a different polarization is used. The different polarizations also preferably result in different damage patterns.

FIGS. 2a to 2e show a number of examples of differently polarized laser radiation. The example of FIG. 2a corresponds to the example from FIG. 1a, and the example from FIG. 2b corresponds to the example from FIG. 1b.

Furthermore, the polarization for a number or all of the writing lines 103 can be set to form a defined angle with respect to the direction of longitudinal extent of the writing line 103. The angle may in this case preferably be between 0° and 90°, in particular between 5° and 85°, in particular between 15° and 75°, in particular between 30° and 60°, in particular between 40° and 50°, or may be 45° or around 45°. This is shown for example by FIGS. 2c to 2e.

FIG. 2d shows that the modifications 9 of different writing lines 103 may have different orientations. It is likewise possible that the modifications 9 of one writing line may be polarized with a different definition at points or in portions.

FIG. 2e shows a variant according to which more than 2, in particular 3 or more than 3, different polarized writing lines 103 are produced.

It is likewise conceivable that the alignment R of individual modifications or a number of modifications or the majority of the modifications of a linear shape deviate from one another. In particular in the case of curved or spiral linear shapes, the alignment R of the modifications may differ from one another. The alignment R of the modifications may therefore change, for example continuously or in steps or in blocks, with a block preferably consisting of a number of modifications, in particular 2-200 or 2 to 100 or 2 to 50.

FIG. 3a shows that the writing lines may be inclined with respect to the intersecting lines 10. Depending on the alignment of the polarization with respect to the writing direction, the modifications 9 thus produced may have an inclined alignment with respect to the intersecting line 10. FIG. 3b shows that the modifications may be produced in a 90° alignment to the intersecting line 10, whereas the writing line is inclined, or rotated in the plane, with respect to the intersecting line 10.

FIG. 4 schematically shows that laser radiation 14 (cf. FIG. 10c) of a laser is introduced into the interior of the solid body 1 via a major surface 8 for altering the material properties of the solid body 1 in the region of at least one laser focus, the laser focus being formed by laser beams of the laser emitted by the laser. Altering the material property forms a linear shape 103 by changing the location of penetration of the laser radiation into the donor substrate 1, with the alterations in the material property being produced on at least one, in particular the same, production plane 4. The crystal lattice planes 6 of the donor substrate 1 are aligned in an inclined manner here with respect to the production plane 4, in particular at an angle of between 0.1° and 9°, preferably of 2° or 4° or 8°. The linear shape 103 or writing line is inclined here with respect to an intersecting line 10 obtained at the intersection between the production plane 4 and the crystal lattice plane 6. As a result of the altered material property, the donor substrate 1 undergoes cracking in the form of subcritical cracks. Not shown here is a step of separating the solid body layer 2 by introducing an external force into the donor substrate 1 for the purpose of connecting the subcritical cracks. Alternatively to this, a sufficient amount of material on the production plane 4 can be altered by means of the laser radiation that, while connecting the subcritical cracks, the solid body layer 2 undergoes detachment from the donor substrate 1. The production plane 4 is preferably parallel to the major surface 8.

The working takes place in the form of producing linear shapes 103 or writing lines or lines which are formed by placement of individual laser shots at a defined distance.

Possible specifically, for example, is the production of a wafer of silicon carbide, in particular of the polytype 4H having a 0001 surface, with/without doping, with an off-angle in the crystal axis of >0° (industry standard are 4° or 8°—about the direction of a major axis). Since the slip plane of the hexagonal crystal structure runs parallel to the 0001 plane, there is an intersecting line of the 0001 crystal plane with the wafer surface, since the latter is inclined with respect to it by the off-angle.

A fundamental consideration of the new method, therefore, is that the working direction of the laser lines 103 deviates from the direction of these intersecting lines. The working direction is also preferably not to extend along one of the main directions of the crystal or along the intersecting lines of the preferred slip plane of the crystal with the surface of the crystal.

Also possible, for example, is the production of a wafer of silicon carbide of polytype 4H. Silicon carbide of polytype 4H has a hexagonal crystal system with a wurtzite structure and a six-fold symmetry in the 0001 plane. Accordingly, a new major axis of the crystal occurs every 60°. If the surface through which the working laser penetrates into the piece of material to be worked is cut along the 0001 plane, then the six-fold symmetry is found again on rotation about the surface normal. A line writing direction that is rotated by 30° to the respective major axes, and is therefore oriented between two major axes, is then obtained here. This ensures that, as far as possible, the written line crosses the unit cells of the crystal, and it is harder for cracks that span substantial regions and affect a number of unit cells at the same time to form. Silicon carbide of polytype 4H is often cut at an off-angle of 4° relative to the 0001 plane, in order to simplify epitaxy steps in the subsequent working. Here it is found that the projection of the major axes of the crystal in relation to one another is also at virtually 60° to one another, so making 30°+/−3° preferred writing angles for the working.

Also possible, for example, is the production of a wafer of cubic SiC (so-called 3C). Cubic SiC behaves like cubic crystal systems, therefore having the 111 plane as the preferred slip plane, resulting in a preferred line writing direction of 22.5°+/−3°.

Also possible, for example, is the production of a wafer of silicon having a 100 surface with/without doping with an off-angle of the crystal axis of 0°.

The preferred slip plane for silicon with its cubic structure (diamond structure) is the 111 plane, which intersects the wafer surface at an angle of 45° to the major axes of the crystal. This therefore results in a target line writing angle of 22.5°+/−3° in relation to the major axes of the crystal and the intersecting lines of the slip plane with the wafer surface that are oriented at a 45° angle to one another.

Because silicon substrates can also be cut with an off-angle, it is possible here again for a different working angle to be preferred. In the case of tilting about a major axis by an angle a, at the surface of the substrate the symmetry is broken from a 4-fold symmetry to a 2-fold symmetry as a result of the tilting. The projected length of the major axis about which tilting does not take place then scales proportionally to cos(a), which leads to changing of the ideal angle between major axes and intersecting line of the slip plane with the surface. The two line writing angles b that are then possible as a result of the breaking of symmetry are then either b1=tan−1(cos a)/2 or b2=tan−1(1/cos a)/2.

For gallium nitride with a hexagonal wurtzite structure, having a 6-fold crystal symmetry in the 0001 plane, the preferred slip plane of which is the 0001 plane, the consequent angle of 60° for the major axes of the crystal produces a preferred line direction at 30°+/−3° to the major axes.

For sapphire or aluminum oxide, with a hexagonal corundum structure having a 6-fold crystal symmetry in the 0001 plane, the consequent angle of 60° for the major axes of the crystal produces a preferred line direction of 30°+/−3° to the major axes for so-called C-plane sapphire.

For A plane-cut sapphire, the major axis orientation is at the 90° angle, with a 180° symmetry, thus producing a preferred line writing angle of 45°+/−3°.

C-plane substrates of sapphire are cut so that the sixfold symmetry is apparent on the surface, and the surface coincides with the slip plane, making the preferred angle 30°+/−3°.

For M plane-cut sapphire, the major axis orientation is at the 90° angle, with a 180° symmetry, thus producing a preferred line writing angle of 45°+/−3°.

R-plane sapphire has no rotation symmetry but has major axis projections at 45° to the projection line of the slip plane, and so here too the preferred writing direction is 22.5°+/−3°.

For lithium tantalate, with a triclinic structure, which is related to the hexagonal crystal system, the writing direction which results, dependent on the orientation of the substrate, is between 10°+/−3° and 45°+/−3° relative to the individual major axes and their projection into the substrate surface.

For gallium arsenide with a zincblende structure, having a 4-fold crystal symmetry in the 100 plane, the preferred slip plane of which is the 111 plane, the consequent angle of 90° for the major axes of the crystal produces a preferred line direction at 22.5°+/−3° to the major axes of the substrate or donor substrate 1 with a 100 surface.

For gallium oxide with a monoclinic, cubic structure, having a 4-fold crystal symmetry in the 100 plane, the preferred slip plane of which is the 111 plane, the consequent angle of 90° for the major axes of the crystal produces a preferred line direction at 22.5°+/−3° to the major axes of the substrate with a 100 surface.

For germanium with a diamond structure, having a 4-fold crystal symmetry in the 100 plane, the preferred slip plane of which is the 111 plane, the consequent angle of 90° for the major axes of the crystal produces a preferred line direction at 22.5°+/−3° to the major axes of the substrate with a 100 surface.

For indium phosphide with a zincblende structure, having a 4-fold crystal symmetry in the 100 plane, the preferred slip plane of which is the 111 plane, the consequent angle of 90° for the major axes of the crystal produces a preferred line direction at 22.5°+/−3° to the major axes of the substrate with a 100 surface.

For yttrium aluminum garnet with a cubic structure, having a 4-fold crystal symmetry in the 100 plane, the preferred slip plane of which is the 111 plane, the consequent angle of 90° for the major axes of the crystal produces a preferred line direction at 22.5°+/−3° to the major axes of the substrate with a 100 surface.

FIG. 5 shows a step of the method for separating at least one solid body layer 2 from a donor substrate 1, and a geometric derivation of the alignment of the writing line 103 or of the alignment of the linear shape.

According to this representation, the method may also or alternatively comprise the following steps:

Providing the donor substrate 1, the donor substrate 1 having crystal lattice planes 6 which are inclined with respect to a planar major surface 8, the major surface 8 forming one boundary of the donor substrate 1 in the longitudinal direction L of the donor substrate 1, with a crystal lattice plane normal 60 being inclined in a first direction with respect to a major-surface normal 80, providing at least one laser 29, introducing laser radiation 14 of the laser into the interior of the solid body or donor substrate 1 via the major surface 8, to alter the material properties of the solid body in the region of at least one laser focus, the laser focus being formed by laser beams of the laser emitted by the laser, altering the material property forming a linear shape by changing the location of penetration of the laser radiation into the donor substrate 1, the linear shape preferably extending in a straight line, at least in portions, and the linear shape, in particular at least the portion that extends in a straight line, being produced parallel to the major surface 8 and extending in a second direction, which is inclined at an angle other than 90° with respect to the first direction, and, as a result of the altered material property, the donor substrate 1 undergoes cracking in the form of sub-critical cracks; separating the solid body layer by introducing an external force into the donor substrate to connect the subcritical cracks, or altering a sufficient amount of material on the production plane by means of the laser radiation that the solid body layer is detached from the donor substrate, while connecting the subcritical cracks. The major surface is in this case preferably part of the solid body layer 2 that is separated.

The second direction is in this case preferably inclined with respect to the first direction in an angle range between 45° and 87°, in particular in an angle range between 70° and 80°, and preferably at 76°.

FIG. 6 shows that the linear shape 103 or the writing line is inclined with respect to the ends of the crystal lattice plane or, as shown in FIG. 5, with respect to an intersecting line 10 obtained at the intersection between the production plane 4 and the crystal lattice plane 6. As a result of this alignment, crack propagation in the direction of the crystal lattice planes 6 (especially slip planes) is restricted. The modifications 9 per writing line are therefore not produced in the same crystal lattice planes 6. For example, the first 1-5% of the modifications per writing line 103 may therefore intersect only a fraction, in particular less than 75% or less than 50% or less than 25% or less than 10%, or no crystal lattice planes, while the last 1-5% of the modifications intersect the same writing line 103 in the longitudinal substrate direction L. This relationship is schematically illustrated in particular by the modification 9a intersecting the crystal lattice planes 6a-6c, and the modification 9b intersecting the crystal lattice planes 6a, 6d and 6e. Accordingly, two modifications 9a and 9b intersect different crystal lattice planes, despite being part of the same linear shape 103 or writing line. It is evident, furthermore, that the modifications 9c and 9d, for example, preferably intersect different crystal lattice planes, in particular predominantly different or completely different crystal lattice planes, than the modification 9a.

The ends 7 of the crystal lattice planes 6 that end on the major surface 8 preferably form a kind of sawtooth pattern in a microscopic sectional representation.

The individual crystal lattice planes 6 are preferably inclined at an angle of between 0.1° and 10°, in particular between 2° and 9°, such as for example 4° or 8°, with respect to the longitudinal axis L. The individual crystal lattice planes of the donor substrate 1 are preferably aligned parallel to one another.

FIG. 7 shows an example of a crystal lattice with a slip plane for 4HSiC; FIG. 8a shows an example of a crystal lattice with a slip plane 110 for Si; FIG. 8b shows an example of a crystal lattice with a slip plane 100 for Si; and FIG. 8c shows an example of a crystal lattice with a slip plane 111 for Si.

The crystal lattice planes 6 are preferably slip planes of a certain type. If the crystal structure is cubic face centered, then the slip plane is preferably the {111} plane and the slip direction is the <110> direction. If the crystal structure is cubic space centered, then the slip plane is preferably the {110} plane and the slip direction is the <111> direction, or the slip plane is preferably the {112} plane and the slip direction is the <111> direction, or the slip plane is preferably the {123} plane and the slip direction is the <111> direction. If the crystal structure is hexagonal, then the slip plane is preferably the {0001} plane and the slip direction is the <1120> direction, or the slip plane is preferably the {1010} plane and the slip direction is the <1120> direction, or the slip plane is preferably the {1011} plane and the slip direction is the <1120> direction.

FIGS. 9a to 10a schematically show the production of a linear shape 103 by means of a laser or a laser device in a donor substrate 1. The linear shape 103 is in this case produced in the form of an arc, or curved. In this case there is preferably no change in the laser device or in the location for modification production. In other words, the location for modification production and the center of rotation 50 of the rotation device 45 preferably remain in the same alignment to one another. There is therefore preferably only a movement of the donor substrate 1 past the laser device 29 or past an outlet for laser radiation 32. The donor substrate 1 is preferably arranged on the rotation device in such a way that the line-forming ends 7 of the crystal lattice planes 6 are aligned with an inclination, in particular at an angle of between 3° and 87° and preferably at an angle of between 10° and 60° or 14° and 45°, with respect to a direction 52 which extends orthogonally to the connecting section 51 between the center of rotation 50 of the rotation device 45 and the center 49 of the donor substrate 1.

It can be seen from an overall consideration of FIGS. 9a-10a that, with progressive rotation of the rotation device 45, the donor substrate 1 is conveyed past the laser device, and the linear shape 103 is produced or extended. At the beginning (FIG. 9a) of the linear shape, it is produced at an angle e to the intersecting line 10 or to a line which is formed by the end of a crystal lattice plane. In the middle (FIG. 9b) of the linear shape, it is produced at an angle m to the intersecting line 10 or to a line that is formed by the end of a crystal lattice plane. At the end (FIG. 10a) of the linear shape, it is produced at an angle s to the intersecting line 10 or to a line which is formed by the end of a crystal lattice plane. The angle e here is preferably greater than the angle m, and the angle m is preferably greater than the angle s. It is likewise conceivable here, however, for the angle s to be larger in amount than the angle m.

The angles are preferably determined such that the centers of two adjacent modifications are conceptually connected to one another, and the angle of the resulting section is determined with respect to the intersecting line 10 or with respect to a line which is formed by the end 7 of a crystal lattice plane 6.

According to the figures of FIG. 9a-10a, the ideal writing angle in the case of an arrangement of rotating substrates is chosen to be the average angle between the angle of the tangent at the margin of the wafer and the tangent in the middle of the wafer; in other words, for SiC, 30° average angle may mean for example—depending on the radius of the rotation table and of the substrate—an angle interval between 25° and 35°, thereby maintaining for example a preferred writing angle of 30° for hexagonal systems on average.

FIG. 10b shows, purely by way of example, a plan view of a rotation device 45. Arranged simultaneously on this rotation device 45 may be a multiplicity of donor substrates, in particular boules or ingots or wafers, in particular more than 2 or more than 3 or more than 5 or more than 10, preferably up to 15 or up to 20 or up to 30.

FIG. 10c shows a schematic side view of a system for producing modifications 9 in the interior of a donor substrate 1 or solid body. An element 29 of a laser device, in particular a laser head, or a beam guide connected to a laser is preferably arranged on a traveling or repositioning device 30, which is preferably in a spatially fixed arrangement. The traveling or repositioning device 30 preferably allows the element 29 of the laser device to be moved, or the laser device to be moved, in a preferably linear direction, in particular in a radial direction of the rotation device 45. Accordingly, after the production of one or more defined writing lines 103, the element 29 of the laser device, or the laser device, is repositioned on preferably a number or all of the donor substrates 1. As a result of the repositioning, the laser beams emitted are introduced into the respective donor substrate 1 at a different location 5 for modification production.

FIG. 11a shows the theoretical basis for the condition $(d-x)/d<y$, where y is preferably −0.31 or less than 0.31 or less than 0.35 or less than 0.4. Here, preferably, furthermore, $d=1.22*lambda/NA$—diffraction-limited focal size. x is preferably the distance of the points or the distance of the centers of two focal points produced in succession on a linear shape. Preferably, furthermore, $x>d$. A numerical aperture which is greater than 0.5 or which is greater than 0.6 or which is greater than 0.65 or which is greater than 0.7 or which is greater than 0.75 or which is greater than 0.8 or which is greater than 0.85 is preferably used.

FIG. 11b shows a surface 200, exposed by a separating step, of a solid body layer separated from a solid body. The surface 200 has in this case a topography, and the topography features elongated zigzag elevations. The elongated zigzag elevations extend predominantly, and in each case in their entirety, in a direction 204 or in two or more directions 204, each direction 204 being different from a direction which is parallel to the crystal lattice planes and parallel to the surface, in particular being inclined thereto at an angle of between 2° and 30°, in particular between 3° and 15°, in particular between 4° and 9°. The average height of the zigzag elevations or the maximum height of the zigzag elevations, in particular with respect to the lowermost point on the surface, is preferably less than 100 µm, in particular less than 75 µm or less than 50 µm or less than 30 µm.

Because the laser energy threshold for generating an equal crack pattern or blackening, i.e., phase transformation/laser modification, in the case of a nonzero angle of the written line to the main flat, is dependent on the travel direction, it may be advantageous to adapt the laser energy for the respective direction of working. This is shown in FIG. 11c, where a meandering travel has been carried out for the working, and where every second line 210 (working direction 1) has a different degree of modification than the respectively adjacent lines 212 (working direction 2). Accordingly, the more weakly formed lines would be adapted to a correspondingly higher laser energy, in order to make the damage pattern as uniform as possible and hence to obtain an equal probability of crack formation in each linear travel.

FIG. 11d shows four different zigzag lines (1)-(4). These lines schematically specify examples which may have the elevations 202 or depressions. The elevations 202 or depressions may be repeated uniformly in portions or approximately uniformly. Uniformly repeating zigzag patterns are shown by the patterns (1) and (2). The elevations and depressions in this case preferably always have a first component, which extends in a first direction, and a second component, which extends in a second direction. These components are preferably repeated along a direction 204, in particular along the writing direction or along the direction in which the modifications of a linear shape have been produced. However, it is also possible here that the first component extends for longer or shorter than an average length "per zig or zag" or in the case of "individual zigs or zags". However, it is also additionally or alternatively possible here that the second component extends for longer or shorter than an average length "per zig or zag" or in the case of "individual zigs or zags". The first direction may preferably change per zig or zag in an angle range between 0° and 45°, in particular in an angle range between 0° and 20° or between 0° and 5°. Preferably, additionally or alternatively, the second direction may change per zig or zag in an angle range between 0° and 45°, in particular in an angle range between 0° and 20° or between 0° and 5°. Examples (3) and (4) show crack profiles with variable length components and angles.

FIG. 12 shows a further preferred embodiment. According to this embodiment, the method for producing modifications 9 in the interior of a solid body 1 preferably has at least the features that laser radiation 14 of a laser 29 is introduced into the interior of the solid body 1 via a first surface 8 of the solid body 1, where the solid body 1 forms a crystal structure and where the laser radiation 14 produces modifications 9 at predetermined locations on a production plane 4 in the interior of the solid body 1. The modifications 9 are in this case preferably produced closer to the first surface 8 than to a second surface, with the second surface preferably being formed parallel to the first surface 8. Furthermore, the method preferably has the feature that the modifications 9 produce a number of linear shapes 103, in particular writing lines, with the solid body 1 cracking subcritically in the region of the respective modification 9.

Furthermore, the method may preferably likewise have the feature that the solid body 1 is arranged on a curved surface 117 of a carrier unit 115. As a result of being arranged on the carrier unit 115, the solid body 1 is converted into a curved state. The surface 117 is in this case preferably curved in the form of a gutter. The solid body is preferably predominantly curved and particularly preferably completely curved. The curvature of the surface 117 preferably corresponds in this case to that of a segment of an orbit. The orbit preferably has in this case a radius that is preferably within a range between: (root of first surface 8 of the solid body 1)*0.25 and (root of first surface 8 of the solid body 1)*100, in particular between (root of first surface 8 of the solid body 1)*0.5 and (root of first surface 8 of the solid body 1)*75, in particular between (root of first surface 8 of the solid body 1)*1 and (root of first surface 8 of the solid body 1)*50, in particular between (root of first surface 8 of the solid body 1)*2 and (root of first surface 8 of the solid body 1)*25.

The solid body 1 may be coupled to the carrier unit 112, for example by means of a vacuum; additionally or alternatively, the solid body 1 may be adhesively bonded to the carrier unit 112.

The curvature produces stresses 13 in the solid body that limit the propagation of the subcritical cracks.

Alternatively, however, it is likewise conceivable that the solid body 1 is coupled to a surface of a convex carrier unit. The curvature of the surface preferably corresponds in this case to that of a segment of an orbit. The orbit preferably has in this case a radius that is preferably within a range between: (root of first surface 8 of the solid body 1)*0.25 and (root of first surface 8 of the solid body 1)*100, in particular between (root of first surface 8 of the solid body 1)*0.5 and (root of first surface 8 of the solid body 1)*75, in particular between (root of first surface 8 of the solid body 1)*1 and (root of first surface 8 of the solid body 1)*50, in particular between (root of first surface 8 of the solid body 1)*2 and (root of first surface 8 of the solid body 1)*25.

FIG. 13 shows a further embodiment. According to this embodiment, before entering the solid body 1, the laser radiation for producing the modifications passes through a pressing body 122 which is at least partly transparent to the laser radiation. The pressing body 122 in this case preferably bears against the first surface 8. The solid body 1 is in this case preferably coupled to a carrier unit 115, in particular adhesively bonded and/or fixed by means of a vacuum and/or pressed on.

The pressing body preferably has a refractive index which corresponds to the refractive index of the solid body.

During modification production, the pressing body produces additional stresses in the solid body, these additional stresses counteracting the propagation of the subcritical cracks.

It is possible, furthermore, that the embodiments of FIGS. 12 and 13 are combined with one another. In that case the pressing body likewise has a curved pressing surface, with the form of the pressing surface corresponding to the curved surface of the solid body with which the pressing surface is brought into contact.

FIG. 14a shows an incident light cone 5700, which produces a focus 5701 in the solid body 1. Depicted here is a focus image of an objective traversed by a laser with a gaussian beam profile.

FIG. 14b schematically depicts a focus image 5702 of an objective traversed by a laser with a NON-gaussian beam profile, for example after the beam has been altered by an SLM. A spatial light modulator (SLM) is a spatial modulator for light and therefore a device by which a spatial modulation can be imparted to light. As compared with the gaussian beam profile, the Z-extent of the focal point is significantly reduced or reducible.

FIG. 14c schematically depicts a focus image 5703 of an objective traversed by a laser with a NON-gaussian beam profile, for example after the beam has been altered by a diffractive optical element (DOE). The beam is in this case preferably divided up by the DOE to form a number of focuses. A DOE preferably serves here for diffracting a laser beam in order to change the spatial imaging of the focal point.

Diffractive optical elements (DOEs) act by diffraction on laser radiation. Structures used here are on the scale of the laser wavelength in their size. By means of numerical simulation of the diffraction of light at diffracting structures, an element is calculated, and can then be produced in larger numbers. Generally speaking, the spatial distribution of the light in the laser beam profile is altered, either directly after the element or at the focal point downstream of a focusing element. This means that for example a beam can be split into a number of beams, that a—usually occurring—gaussian beam intensity profile is converted into a different form, or that the intensity distribution of the laser radiation at the focus is changed in a way which cannot be achieved by conventional lenses, for example, by the deliberate introduction or suppression of secondary maxima which are needed for the desired laser interaction.

In contrast to this, a spatial light modulator (SLM) is a device for imparting a spatial modulation to light.

An SLM commonly modulates the intensity of a light beam, though it is also possible for the phase, or else the phase and the intensity simultaneously, to be modulated.

This spatial modulation is performed in the case of the DOE by the structures in the element, while in the case of the SLM it is performed by the individual pixels on the SLM. Particularly after imaging or focusing an intensity-modulated and phase-modulated beam, programmable intensity distributions at the focus can be achieved in this way. Thus, while a DOE acts statically and reproducibly on the laser beam, it is possible by means of an SLM for example to carry out a dynamic changeover of the number of beams or else the laser beam profile used in a laser working apparatus. Dynamic adaptation in the course of the process is also possible, for example after feedback from simultaneous monitoring of the progress of the process.

The method hereby proposed includes the step of altering a beam property of the laser beams before penetrating into the solid body, the beam property being the intensity distribution at the focus, where the alteration or adaptation of the beam property is brought about by at least or exactly one spatial light modulator and/or by at least or exactly one DOE, with the spatial light modulator and/or the DOE being arranged in the beam path of the laser radiation between the solid body and the radiation source.

For explanation of the functioning of DOEs and spatial light modulators, reference is made to the following publication: Flexible beam shaping system for the next generation of process development in laser micromachining, LANE 2016, 9th International Conference on Photonic Technologies LANE 2016, Tobias Klerks, Stephan Eifel.

Laser beam intensity profiles which deviate from the normally customary gaussian form are referred to as non-gaussian beam profiles and can be used in order to achieve a different outcome of working. Conceivable, for example, is a line focus which has a significantly different extent in a dimension perpendicular to the beam propagation direction than in a second dimension. This allows broader regions of the workpiece to be covered by the laser beam in the working step. Known here as a "top-hat" profile is a profile which has a constant intensity at the center of the beam, thus offering the advantage that when working at the focus there are no regions of different intensity, or at least only regions of equal intensity above the laser working threshold. This may be used for example to minimize the abrasion losses after separation.

The present subject matter therefore preferably relates to a method for producing modifications 9 in the interior of a solid body 1. The method preferably comprises the step of introducing laser radiation 14 of a laser 29 into the interior of the solid body 1 via a first surface 8 of the solid body 1. The surface 8 via which the laser radiation 14 penetrates into the solid body 1 is preferably part of the solid body layer to be separated. The solid body layer to be separated is preferably thinner than the remaining, residual fraction of the solid body.

The solid body 1 preferably forms a crystal structure, and the laser radiation 14 produces modifications 9 at predetermined locations on a production plane 4 in the interior of the solid body 1. The production plane is in this case preferably parallel to the first surface 8. The modifications 9 are preferably closer to the first surface 8 than to a second surface, with the second surface preferably being formed parallel to the first surface 8. The modifications 9 produce a number of linear shapes 103, in particular dotted or continuous writing lines, with the solid body 1 undergoing subcritical cracking in the region of the respective modification 9, and the subcritical cracks having orthogonally to the direction of longitudinal extent of the respective linear shape a crack length or average crack length of less than 150 µm, in particular of less than 120 µm or less than 110 µm or less than 90 µm or less than 75 µm or less than 60 µm.

The modifications 9 which belong to the same linear shape 103 and are successively produced are preferably produced at a distance from one another which is defined by the function $(d-x)/d < -0.31$, in particular $< -0.4$.

Additionally or alternatively, the laser radiation may be of a defined polarization. The direction of polarization of the laser radiation 14 is in this case preferably oriented at a defined angle or in a defined angle range with respect to the crystal axis of the solid body 1, or the direction of longitudinal extent R of the modifications 9 produced in the interior of the solid body 1 by means of the laser beams 14 is oriented at a defined angle or in a defined angle range with respect to an intersecting line 10 obtained at the intersection between the production plane 4 and the crystal lattice plane 6.

Furthermore, the present subject matter may relate to a method for producing at least one solid body layer, in particular for separating at least one solid body layer from a solid body. This method preferably comprises at least the steps of: carrying out a method described herein, introducing an external force into the solid body 1 for producing stresses in the solid body 1 and/or producing an internal force in the solid body 1, with the external and/or internal force being so strong as to result in crack propagation along the detachment region 8.

LIST OF REFERENCE SIGNS

| | | | |
|---|---|---|---|
| 1 | Solid body/donor substrate | 45 | Rotation device |
| 2 | Solid body layer | 49 | Center |
| 4 | Production plane | 50 | Center of rotation |
| 5 | Location for modification production | 51 | Connecting section |
| 6 | Crystal lattice plane | 52 | Direction |
| 6a/b/c | Crystal lattice planes | 60 | Crystal lattice plane normal |
| 7 | End of the crystal lattice plane | 80 | Major-surface normal |
| 8 | Major surface/first surface | 90 | Normal plane |
| 9 | Modification | 92 | Plane orthogonal to the normal plane |
| 9a/b | Modifications | 94 | Direction of extent of the ends of the crystal lattice planes |
| 10 | Intersecting line | 103 | Laser line/writing line |
| 12 | Subcritical crack | 115 | Chuck/carrier unit |
| 11 | Flat | 117 | Curved surface |
| 13 | Mechanical stresses | 120 | Connecting location |
| 14 | Laser radiation | 122 | Body at least partly transparent to the laser radiation |
| 29 | Laser | 200 | Surface of the solid body layer exposed by separation |
| 30 | Repositioning device | 5700 | Light cone |
| 32 | Laser radiation | 5702 | Focus image |
| 202 | Zigzag-shaped elevations | 5703 | Focus image |
| 204 | Direction of extent of the zigzag-shaped elevation(s) | R | Direction of longitudinal extent of the modification |
| 210 | First direction | | |
| 212 | Second direction (opposite to the first direction 210) | | |

The invention claimed is:

1. A method for producing modifications in an interior of a solid body, the method comprising:
providing a laser; and
introducing laser radiation from the laser into the interior of the solid body via a first surface of the solid body, the laser radiation producing modifications at predetermined locations on a production plane in the interior of the solid body,
wherein the solid body forms a crystal structure,
wherein the solid body has a second surface parallel to the first surface,
wherein a plurality of linear shapes are produced by the modifications, wherein the solid body cracks subcritically in a region of each respective modification to form subcritical cracks, wherein the subcritical cracks have orthogonality to a direction of longitudinal extent of the respective linear shape and an average crack length of less than 150 µm, wherein the modifications that belong to the same linear shape and are successively produced are spaced at a distance from one another which is defined by: $(d-x)/d<-0.31$, wherein d is the diameter of a focal point of the laser radiation and x is the distance between adjacent focal points of the laser radiation, wherein $x>d$, wherein the distance between two directly adjacent linear shapes in each case is less than 50 µm.

2. The method of claim 1, wherein the laser radiation has a defined polarization, wherein the direction of polarization of the laser radiation is oriented at a defined angle or in a defined angle range with respect to a crystal axis of the solid body.

3. The method of claim 1, wherein the direction of longitudinal extent is aligned at a defined angle or in a defined angle range with respect to an intersecting line obtained at an intersection between the production plane and a crystal lattice plane of the solid body.

4. The method of claim 1, wherein producing the modifications comprises:
producing a first part of the modifications in the solid body during a first relative movement of the solid body with respect to an optics of the laser; and
producing a second part of the modifications in the solid body during a second relative movement of the solid body with respect to the optics of the laser.

5. The method of claim 4, further comprising:
changing at least one setting of one laser parameter during the first relative movement compared to the second relative movement,
wherein the first relative movement corresponds to a linear movement in a first direction and the second relative movement corresponds to a linear movement in a second direction,
wherein the first direction and the second direction are oriented parallel to one another.

6. The method of claim 1, wherein the laser radiation is linearly polarized, elliptically polarized or circularly polarized.

7. The method of claim 1, further comprising:
arranging a diffractive optical element (DOE) in a path of the laser radiation, the DOE dividing up the laser radiation over a plurality of light paths to produce a plurality of focuses in the solid body.

8. The method of claim 1, wherein the solid body comprises crystal lattice planes that are inclined with respect to the first surface, wherein the first surface of the solid body forms one boundary in the longitudinal direction of the solid body, wherein a crystal lattice plane normal is inclined in a first direction with respect to a major-surface normal, wherein crystal lattice planes of the solid body are aligned in an inclined manner with respect to the production plane, and wherein the linear shapes are aligned in an inclined manner with respect to an intersecting line obtained at the intersection between the production plane and the corresponding crystal lattice plane.

9. The method of claim 1, wherein an amount of material of the solid body is altered, while forming a linear shape, such that ends of individual crystal lattice planes of the solid body are exposed by separation of solid body layers, and wherein the material alterations produce elevation or depression patterns for which a plurality of linear material alteration regions are produced.

10. The method of claim 1, further comprising:
moving the solid body in relation to the laser,
wherein the laser is set continuously, in dependence on at least one parameter, for defined focusing of the laser radiation and/or for adapting the laser energy,
wherein one parameter of the at least one parameter is a degree of doping of the solid body at a predetermined location or in a predetermined region.

11. A method for producing at least one solid body layer, the method comprising:
carrying out the method of claim 1; and
introducing an external force into the solid body, the force producing stresses in the solid body and/or producing an internal force in the solid body,
wherein the external force and/or the internal force cause crack propagation along subcritical cracks and formation of a detachment region.

* * * * *